US012382160B2

(12) United States Patent
Han et al.

(10) Patent No.: US 12,382,160 B2
(45) Date of Patent: *Aug. 5, 2025

(54) ELECTRONIC DEVICE AND OPERATING METHOD THEREOF

(71) Applicant: Samsung Electronics Co., Ltd., Suwon-si (KR)

(72) Inventors: Na-Woong Han, Seoul (KR); Ki Hyoung Son, Yongin-si (KR); Kyungjun Lee, Suwon-si (KR); Hyunyeul Lee, Seoul (KR)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

This patent is subject to a terminal disclaimer.

(21) Appl. No.: 18/356,683

(22) Filed: Jul. 21, 2023

(65) Prior Publication Data
US 2023/0370711 A1 Nov. 16, 2023

Related U.S. Application Data

(63) Continuation of application No. 17/368,157, filed on Jul. 6, 2021, now Pat. No. 11,743,571, which is a
(Continued)

(30) Foreign Application Priority Data
Apr. 1, 2016 (KR) .................. 10-2016-0040318

(51) Int. Cl.
*H04N 23/611* (2023.01)
*H04N 23/10* (2023.01)
(Continued)

(52) U.S. Cl.
CPC .......... *H04N 23/611* (2023.01); *H04N 23/10* (2023.01); *H04N 23/62* (2023.01); *H04N 23/63* (2023.01);
(Continued)

(58) Field of Classification Search
CPC ...... H04N 23/10; H04N 23/611; H04N 23/62; H04N 23/63; H04N 23/632; H04N 23/667; H04N 23/68; H04N 23/73; G06F 3/017
(Continued)

(56) References Cited

U.S. PATENT DOCUMENTS 7,978,248 B2   7/2011 Terashima
8,237,803 B2   8/2012 Yumiki
(Continued)

FOREIGN PATENT DOCUMENTS

CN   101388965 A   3/2009
CN   101998058 A   3/2011
(Continued)

OTHER PUBLICATIONS

Brazilian Office Action dated Nov. 16, 2023, issued in Brazilian Patent Application No. 112018069786-9.
(Continued)

*Primary Examiner* — Behrooz M Senfi
(74) *Attorney, Agent, or Firm* — Jefferson IP Law, LLP

(57) ABSTRACT

An electronic device is provided. The electronic device includes a camera, a display, a processor electrically coupled with the camera and the display, and a memory electrically coupled with the processor. The memory is configured to store instructions which, when executed, instruct the processor to, when a photographing request signal is received, estimate a motion of a subject within an image that is acquired by the camera, when the motion of the subject within the image acquired by the camera is not recognized, control the camera to capture a first type image by applying a first photographing condition, and when the motion of the subject within the image acquired by the camera is recog-
(Continued)

nized, control the camera to capture a second type image by applying a second photographing condition.

20 Claims, 20 Drawing Sheets

Related U.S. Application Data continuation of application No. 16/895,568, filed on Jun. 8, 2020, now Pat. No. 11,089,206, which is a continuation of application No. 15/471,608, filed on Mar. 28, 2017, now Pat. No. 10,681,263.

(51) Int. Cl.
*H04N 23/62* (2023.01)
*H04N 23/63* (2023.01)
*H04N 23/667* (2023.01)
*H04N 23/68* (2023.01)
*H04N 23/73* (2023.01)
*G06F 3/01* (2006.01)

(52) U.S. Cl.
CPC ........... *H04N 23/667* (2023.01); *H04N 23/68* (2023.01); *H04N 23/73* (2023.01); *G06F 3/017* (2013.01); *H04N 23/632* (2023.01)

(58) Field of Classification Search
USPC .......................................................... 348/77
See application file for complete search history.

(56) References Cited

U.S. PATENT DOCUMENTS

| | | | |
|---|---|---|---|
| 9,280,223 B2 | 3/2016 | Toida et al. | |
| 10,681,263 B2 * | 6/2020 | Han | H04N 23/667 |
| 11,089,206 B2 * | 8/2021 | Han | H04N 23/73 |
| 11,743,571 B2 * | 8/2023 | Han | H04N 23/10 |
| 2006/0115297 A1 * | 6/2006 | Nakamaru | H04N 23/682 |
| | | | 399/163 |
| 2009/0073285 A1 * | 3/2009 | Terashima | H04N 23/633 |
| | | | 348/222.1 |
| 2009/0167877 A1 | 7/2009 | Imamura | |
| 2010/0194931 A1 | 8/2010 | Kawaguchi et al. | |
| 2011/0043639 A1 | 2/2011 | Yokohata | |
| 2011/0261225 A1 | 10/2011 | Niinami | |
| 2011/0317031 A1 | 12/2011 | Honda | |
| 2012/0062720 A1 | 3/2012 | Choi et al. | |
| 2012/0133730 A1 | 5/2012 | Ino | |
| 2012/0242853 A1 | 9/2012 | Jasinski et al. | |
| 2013/0194215 A1 | 8/2013 | Toida et al. | |
| 2013/0238724 A1 | 9/2013 | Cunningham | |
| 2014/0028885 A1 | 1/2014 | Ma et al. | |
| 2014/0192247 A1 | 7/2014 | Cheong et al. | |
| 2014/0204244 A1 | 7/2014 | Choi et al. | |
| 2014/0328578 A1 | 11/2014 | Shafron et al. | |
| 2015/0022698 A1 | 1/2015 | Na et al. | |
| 2015/0103002 A1 | 4/2015 | Yoon et al. | |
| 2015/0189142 A1 | 7/2015 | Kang | |
| 2015/0195440 A1 | 7/2015 | Lee et al. | |
| 2015/0229837 A1 | 8/2015 | Her et al. | |
| 2015/0319341 A1 | 11/2015 | Sekine | |
| 2015/0341561 A1 | 11/2015 | Petrescu et al. | |
| 2015/0358549 A1 | 12/2015 | Cho et al. | |
| 2016/0127641 A1 * | 5/2016 | Gove | H04N 23/64 |
| | | | 348/143 |
| 2016/0205291 A1 | 7/2016 | Narahari et al. | |
| 2017/0180589 A1 | 6/2017 | Guo et al. | |
| 2017/0310865 A1 | 10/2017 | Zhou et al. | |
| 2021/0209388 A1 | 7/2021 | Ciftci et al. | |

FOREIGN PATENT DOCUMENTS

| | | | | |
|---|---|---|---|---|
| CN | 102572238 A | | 7/2012 | |
| CN | 103227898 A | | 7/2013 | |
| CN | 104767933 A | | 7/2015 | |
| CN | 104881296 A | | 9/2015 | |
| CN | 105763797 A | * | 7/2016 | ............. H04N 5/232 |
| EP | 2 860 954 A1 | | 4/2015 | |
| JP | 2004193980 A | * | 7/2004 | ............. H04N 5/225 |
| JP | 2009-071666 A | | 4/2009 | |
| JP | 4325487 B2 | | 9/2009 | |
| JP | 2011233963 A | | 11/2011 | |
| JP | 2014116957 A | | 6/2014 | |
| JP | 2014212395 A | * | 11/2014 | ............. H04N 5/232 |
| JP | 2015019416 A | * | 1/2015 | ......... H04N 5/23245 |
| KR | 10-2010-0120982 A | | 11/2010 | |
| KR | 10-2014-0089697 A | | 7/2014 | |
| KR | 10-2015-0078275 A | | 7/2015 | |
| KR | 20160028977 A | | 3/2016 | |
| WO | WO-2013069049 A1 | * | 5/2013 | ............. G03B 37/02 |

OTHER PUBLICATIONS

Australian Notice of Acceptance dated Nov. 8, 2023, issued in Australian Patent Application No. 2022201893.
Chinese Office Action dated Apr. 7, 2020, issued in Chinese Application No. 201780021199.8.
European Search Report dated Jan. 30, 2019, issued in European Patent Application No. 17775889.3.
European Search Report dated May 9, 2019, issued in European Patent Application No. 17775889.3.
European Search Report dated Feb. 19, 2020, issued in European Application No. 17 775 889.3-1208.
Summons to attend oral proceedings dated May 10, 2021, in European Application No. 17775889.3.
Indian Office Action dated Jun. 2, 2021, issued in Indian Application No. 201817037963.
European Office Action dated Sep. 18, 2020, issued in European Application No. 17 775 889.3-1208.
Australian Office Action dated Mar. 6, 2023, issued in Australian Patent Application No. 2022201893.
Korean Office Action dated Apr. 18, 2022, issued in Korean Patent Application No. 10-2016-0040318.
Notice of Patent Grant dated Oct. 25, 2022, issued in Korean Application No. 10-2016-0040318.
Indian Hearing Notice dated Aug. 25, 2023, issued in Indian Patent Application No. 201817037963.

* cited by examiner

ELECTRONIC DEVICE AND OPERATING METHOD THEREOF

CROSS-REFERENCE TO RELATED APPLICATION(S)

This application is a continuation application of prior application Ser. No. 17/368,157, filed Jul. 6, 2021, which application is a continuation application of prior application Ser. No. 16/895,568, filed Jun. 8, 2020, and has issued as U.S. Pat. No. 11,089,206 on Aug. 10, 2021, which is a continuation application of prior application Ser. No. 15/471,608 filed on Mar. 28, 2017, and has issued as U.S. Pat. No. 10,681,263 on Jun. 9, 2020, which is based on and claimed the benefit under 35 U.S.C. § 119(a) of a Korean patent application number 10-2016-0040318, filed on Apr. 1, 2016, in the Korean Intellectual Property Office, the disclosure of which is incorporated by reference herein in its entirety.

TECHNICAL FIELD

The present disclosure relates to an electronic device capable of capturing an image, and an operation thereof.

BACKGROUND

Recently, with the growth of digital technologies, various types of electronic devices are being widely used, such as mobile communication terminals, smart phones, tablet personal computers (PCs), personal digital assistants (PDAs), electronic organizers, notebook computers, wearable devices, etc. The electronic devices have reached a mobile convergence stage that puts together even functions of other devices.

The electronic device can be an imaging device having image sensors. The imaging device can acquire an image by a user's selection.

The above information is presented as background information only to assist with an understanding of the present disclosure. No determination has been made, and no assertion is made, as to whether any of the above might be applicable as prior art with regard to the present disclosure.

SUMMARY

The electronic device stated above may acquire an image in various methods.

An image acquisition method could capture an image by a user's selection. However, if a subject moves, a user of the electronic device may find it difficult to photograph a natural action of the subject. For example, if the subject takes an unexpected motion, the user may find it difficult to photograph the subject when it performs the corresponding motion.

Aspects of the present disclosure are to address at least the above-mentioned problems and/or disadvantages and to provide at least the advantages described below. Accordingly, an aspect of the present disclosure is to provide an electronic device and an operating method thereof, capable of photographing an image based on a user's selection and a photographing state recognition of the device.

Another aspect of the present disclosure is to provide an electronic device and an operating method thereof, capable of photographing an image based on a user's selection and a motion of a subject.

Another aspect of the present disclosure is to provide an electronic device and an operating method thereof, capable of photographing an image based on a user's selection, a motion of a subject, and a motion of the device.

Another aspect of the present disclosure is to provide an electronic device and an operating method thereof, capable of photographing an image based on a user's selection, a motion of a subject, a motion of the device, an emotion change of a subject (e.g., person), etc.

In accordance with an aspect of the present disclosure, an electronic device is provided. The electronic device includes a camera, a display, a processor electrically coupled with the camera and the display, and a memory electrically coupled with the processor. The memory is configured to store instructions which, when executed, instruct the processor to, when a photographing request signal is received, estimate a motion of a subject within an image that is acquired by the camera, when the motion of the subject within the image acquired by the camera is not recognized, control the camera to capture a $1^{st}$ type image by applying a $1^{st}$ photographing condition, and when the motion of the subject within the image acquired by the camera is recognized, control the camera to capture a $2^{nd}$ type image by applying a $2^{nd}$ photographing condition.

In accordance with another aspect of the present i disclosure, a method of an electronic device is provided. The method includes, when a photographing request signal is received, estimating a motion of a subject within an image that is acquired by a camera, when the motion of the subject within the image acquired by the camera is not recognized, controlling the camera to capture a $1^{st}$ type image by applying a $1^{st}$ photographing condition, and when the motion of the subject within the image acquired by the camera is recognized, controlling the camera to capture a $2^{nd}$ type image by applying a $2^{nd}$ photographing condition.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purposes only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

An electronic device according to various embodiments of the present disclosure may, for example, include at least one of a smart phone, a tablet personal computer (PC), a mobile phone, a video phone, an electronic book (e-book) reader, a desktop PC, a laptop PC, a netbook computer, a workstation, a server, a personal digital assistant (PDA), a portable multimedia player (PMP), a moving picture experts group (MPEG-1 or MPEG-2) audio layer 3 (MP3) player, a mobile medical device, a camera, or a wearable device.

An electronic device according to various embodiments is described below with reference to the accompanying drawings. In the present document, the term 'user' may denote a person who uses the electronic device or a device (e.g., artificial-intelligent electronic device) which uses the electronic device. In various embodiments of the present disclosure, the electronic device includes an image sensor, and may be an imaging device capable of acquiring an image through the image sensor.

Figure 1:
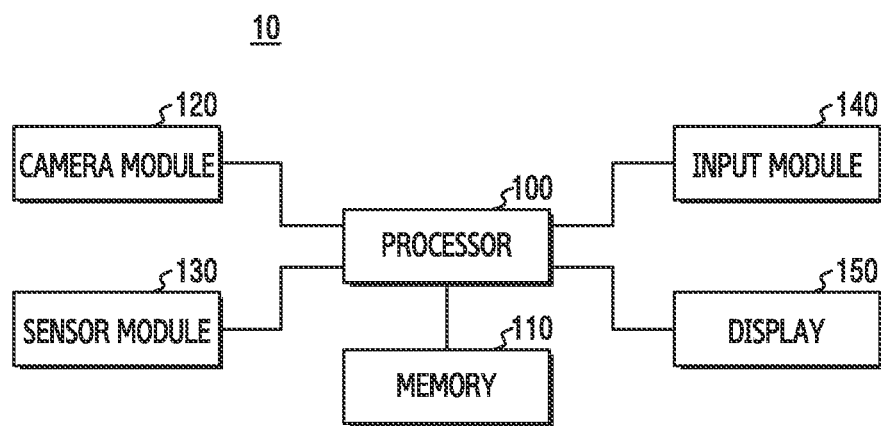
FIG. 1 is a diagram illustrating a construction of an electronic device according to an embodiment of the present disclosure.

FIG. 1 is a diagram illustrating a construction of an electronic device according to an embodiment of the present disclosure.

Referring to FIG. 1, an electronic device 10 may include a processor 100, a memory 110, a camera module 120, a sensor module 130, an input module 140, and/or a display 150. In an embodiment, the electronic device 10 may omit at least one of the constituent elements or additionally have another constituent element.

The processor 100 may include one or more of a central processing unit (CPU), an application processor (AP), or a communication processor (CP). The processor 100 may, for example, execute operation or data processing according to control and/or application execution of at least one another constituent element of the electronic device 10.

The processor 100 according to various embodiments of the present disclosure may include an image signal processor (ISP), a subject motion estimating module, a device motion detecting module, an emotion recognizing module, an image controlling module, a display processing module, etc. In various embodiments of the present disclosure, the processor 100 may execute a photographing application that acquires an image. The electronic device 10 according to various embodiments of the present disclosure may execute an application (hereinafter, referred to as a 'user-device photographing application') that is capable of photographing an image by a user and/or the electronic device 10.

In an embodiment, if the user-device photographing application is executed, the processor 100 may estimate a motion of a subject within an image. The processor 100 may execute a function of capturing an image based on a user's selection and/or the motion of the subject.

In an embodiment, the processor 100 may estimate a motion of a subject within an image, and may detect a motion of the electronic device 10. The processor 100 may set, as a photographing condition, a state in which the motion of the subject is detected and/or a state in which the motion of the electronic device 10 is detected. The processor 100 may execute a function of capturing an image based on a user's selection or the set photographing condition.

In an embodiment, the processor 100 may estimate a motion of a subject within an image, and may detect a motion of the electronic device 10, and may recognize the emotion of a subject (e.g., person) within the image. The processor 100 may set, as a photographing condition, a state in which the motion of the subject is recognized, or the motion of the electronic device 10 is detected, or an emotion change of the subject is recognized. The processor 100 may execute a function of capturing an image based on a user's selection or the set photographing condition.

The memory 110 may include a volatile and/or non-volatile memory. The memory 110 may store a command or data related to at least one another constituent element of the electronic device. The memory 110 may store a software and/or program. The program may, for example, include a kernel, a middleware, an application programming interface (API), an application program (or "application"), etc. At least some of the kernel, the middleware, or the API may be called an operating system (OS). The memory 110 according to various embodiments of the present disclosure may store a software and/or program for performing the user-device photographing application, and may include a memory (or buffer) that buffers and stores captured images.

The sensor module 130 may meter a physical quantity and sense an activation state of the electronic device 10, and convert metered or sensed information into an electrical signal. The sensor module 130 may include an acceleration sensor and/or a gyro sensor that are capable of sensing a motion of the electronic device 10. The acceleration sensor may sense a horizontal and/or vertical movement of the electronic device 10, and the gyro sensor may sense the rotation movement of the electronic device 10.

The sensor module 130 may further include at least one of a gesture sensor, a barometer, a magnetic sensor, a grip sensor, a proximity sensor, a color sensor (e.g., a red, green, blue (RGB) sensor), a medical sensor, a temperature-humidity sensor, an illuminance sensor, a ultraviolet (UV) sensor, or a flexibility sensing sensor sensing the bending of the electronic device 10.

Additionally or alternatively, the sensor module 130 may further include a control circuit for controlling at least one or more sensors belonging therein. In some embodiments, the electronic device 10 may further include a processor (e.g., low power processor) configured to control the sensor module 130 as a part of or apart from the processor 100, so the electronic device 10 may control the sensor module 130 while the processor 100 is in a sleep state.

The camera module 120 is, for example, a device able to take a still picture and a moving picture. According to an embodiment, the camera module 120 may include one or more image sensors (e.g., a charge coupled device (CCD) sensor and/or a complementary metal-oxide-semiconductor (CMOS) sensor), a lens unit, an image processing module (i.e., image signal processor (ISP)), or a flash (e.g., a light emitting diode (LED), a xenon lamp, etc.). The ISP may be included in the processor 100 as well. In various embodiments of the present disclosure, a description will be made by way of an example in which the image processing module (i.e., ISP module) is included in the processor 100.

According to various embodiments of the present disclosure, the camera module 120 may photograph an image based on the control of the processor 100. The camera module 120 may control a photographing interval time and/or exposure time under the control of the processor 100.

The input module 140 may include at least one of a touch panel, a (digital) pen sensor, a key or ultrasonic input units. The touch panel may employ (use) at least one scheme among a capacitive overlay scheme, a pressure sensitive scheme, an infrared beam scheme, or an ultrasonic scheme. Also, the touch panel may further include a control circuit as well. The touch panel may further include a tactile layer to provide a tactile response to a user. The touch panel according to various embodiments of the present disclosure may include a pressure sensor function. The (digital) pen sensor may be a part of the touch panel or include a separate sheet for recognition. The key may include a physical button, an optical key, or a keypad. The ultrasonic input unit may sense an ultrasonic wave generated in an input tool, through a microphone, and check data corresponding to the sensed ultrasonic wave.

The display 150 may include a liquid crystal display (LCD), a light emitting diode (LED) display, an organic light emitting diode (OLED) display, a micro-electro-mechanical systems (MEMS) display, or an electronic paper display. The display 150 may display various screens (e.g., a text, an image, a video, an icon, a symbol, etc.) for a user.

The input module 140 and the display 150 may be constructed as a one-piece touch screen. The touch screen may display a screen under the control of the processor 100, and may detect a touch, gesture, proximity, or hovering input that uses an electronic pen or a part of the user's body.

The electronic device 10 may further include another module besides the construction of FIG. 1. For example, the electronic device 10 may be a mobile communication device (for example, a smart phone, etc.) that further includes a communication module. The communication module may include a wireless communication module and a wired communication module. The wireless communication module may include a cellular communication module and a short-range communication module.

The cellular communication module may use at least one of long term evolution (LTE), LTE-advanced (LTE-A), code division multiple Access (CDMA), Wideband CDMA (WCDMA), universal mobile telecommunications system (UMTS), wireless broadband (WiBro), global system for mobile communications (GSM), etc. The cellular communication module may, for example, provide voice telephony, video telephony, a text service, an Internet service, etc., through a telecommunication network. According to an embodiment, the cellular communication module may perform the distinction and authentication of the electronic device 10 within a telecommunication network, using a subscriber identification module (e.g., subscriber identification module (SIM) card). According to an embodiment, the cellular communication module may perform at least some functions among functions that the processor 100 may provide. According to an embodiment, the cellular communication module may include a communication processor (CP).

The short-range communication module may include at least one of Wi-Fi, Bluetooth (BT), near field communication (NFC), magnetic secure transmission (MST), a global navigation satellite system (GNSS), a global positioning system (GPS), etc. The MST may use an electromagnetic signal, to generate a pulse in accordance with transmission data. The pulse may generate a magnetic field signal. The electronic device 10 may transmit the magnetic field signal to a point of sales (POS). By detecting the magnetic field signal through an MST reader and converting the detected magnetic field signal into an electrical signal, the POS may restore data. In accordance with a use area, a bandwidth, etc., the GNSS may, for example, include at least one of a GPS, a Global navigation satellite system (Glonass), a Beidou navigation satellite system (hereinafter, "Beidou"), Galileo, or the European global satellite-based navigation system. Below, the "GPS" may be used interchangeably with the "GNSS."

The wired communication module may, for example, include at least one of a universal serial bus (USB), a high definition multimedia interface (HDMI), a recommended standard-232 (RS-232), a plain old telephone service (POTS), etc.

In various embodiments of the present disclosure described below, the electronic device 10 may include an image sensor, and may be an imaging device capable of processing images acquired through the image sensor. For example, in various embodiments of the present disclosure, the electronic device 10 may include all devices that make use of one or more of various processors of an AP, a CP, a graphic processing unit (GPU), a central processing unit (CPU), etc., such as all information communication equipments, multimedia equipments, wearable devices, and applied equipments for these, which support functions according to various embodiments of the present disclosure.

In various embodiments of the present disclosure described below, a hardware access method is described as an example. However, the various embodiments of the present disclosure include a technology using all of hardware and software, so it is not that the various embodiments of the present disclosure exclude a software-based access method.

The electronic device 10 according to various embodiments of the present disclosure includes a camera module. The electronic device 10 may control the camera module in accordance with a user's selection and/or a state of the electronic device 10 or a subject, to capture an image. For example, the electronic device 10 may capture an image by the user's selection. Also, the electronic device 10 may automatically capture an image if a motion of a subject within the image is estimated or a motion of the electronic device 10 is detected or an emotion change of the subject within the image is recognized.

Figure 2:
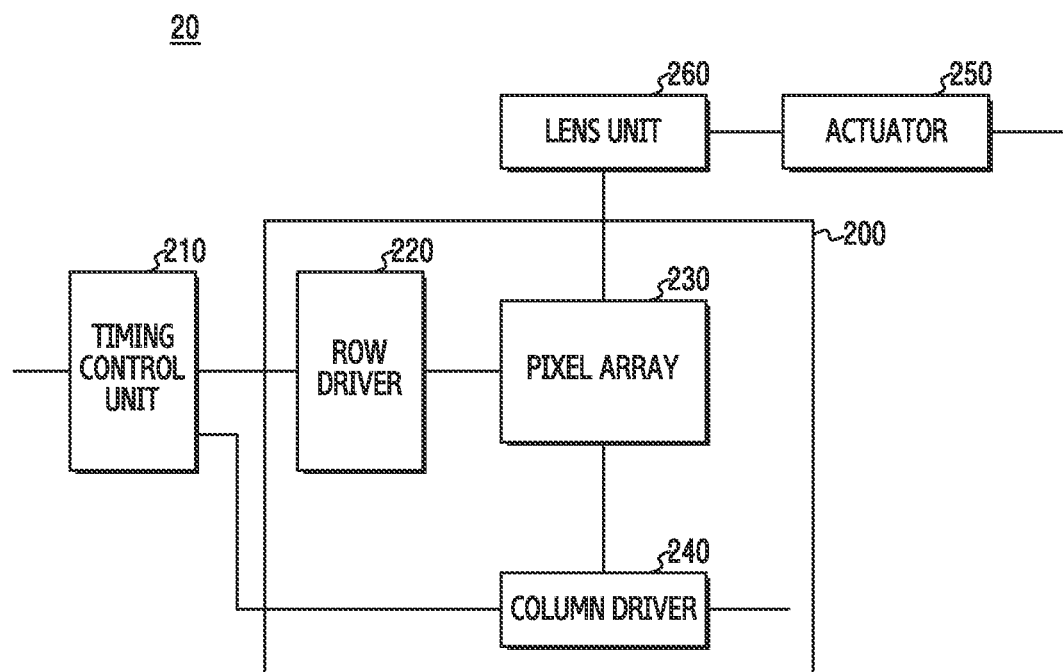
FIG. 2 is a diagram illustrating a construction of a camera module according to an embodiment of the present disclosure.

FIG. 2 is a diagram illustrating a construction of a camera module according to an embodiment of the present disclosure. The camera module 20 may be the camera module 120 of FIG. 1.

Referring to FIG. 2, the camera module 20 may include a timing control unit 210, an image sensor 200, an actuator 250, and a lens unit 260. The image sensor 200 may include a row driver 220, a pixel array 230, and a column driver 240.

The lens unit 260 may perform an operation of imaging an external light signal. The actuator 250 may control the lens unit 260 under the control of a processor. For example, the lens unit 260 may perform functions of focusing, tracking, and zooming-in/out based on the driving of the actuator 250.

The timing control unit 210 may control an operation timing of the image sensor 200. The timing control unit 210 may generate a timing control signal for controlling the exposure and readout of the image sensor 200. The timing control unit 210 may be either located within the camera module 20, or may be constructed within the processor.

The row driver 220 may set an exposure time of the pixel array 230 by the timing control unit 210. The pixel array 230 may generate, as pixel signals, light signals that are imaged in the lens unit 260. Respective pixels constructing the pixel array 230 may include micro lenses, color filters, and/or photo detectors. For example, a resolution (the number of row pixels of the pixel array*the number of column pixels) of the pixel array 230 may be standard definition (SD) (720*480), high definition (HD) (1280*720), full HD (1920*1080), ultra high definition (UHD) (3840*2160), etc. The respective pixels of the pixel array 230 may generate, as pixel signals, signals that are imaged through the lens unit 260 during the exposure time, respectively. The exposure time may be the time for which pixel sensors of the pixel array 230 receive light.

The column driver 240 may read out column pixel signals of the pixel array 230 by the control of the timing control unit 210. For example, the column driver 240 may select and read out line image signals in sequence under the control of the timing control unit 210. The column driver 240 may include an analog to digital converter (ADC). The ADC may convert a pixel signal outputted by the unit of line, into digital data. The column driver 240 may output the digital data converted in the ADC, in a mobile industry processor interface (MIPI) scheme.

The image sensor 200 may be driven in a driving method such as a global shutter or rolling shutter scheme. The shutter may represent controlling the exposure time of the pixel array 230 when an image is acquired. The global shutter scheme may be a scheme of simultaneously conducting the exposure of row lines of the pixel array 230 and reading out pixel signals of the pixel array 230 by the unit of line. The rolling shutter scheme may be a scheme of sequentially conducting the exposure of row lines of the pixel array 230 and sequentially reading out pixel signals of the row lines of which the exposure time expires. In an embodiment, the image sensor 200 may be driven in the rolling shutter scheme.

Figure 3:
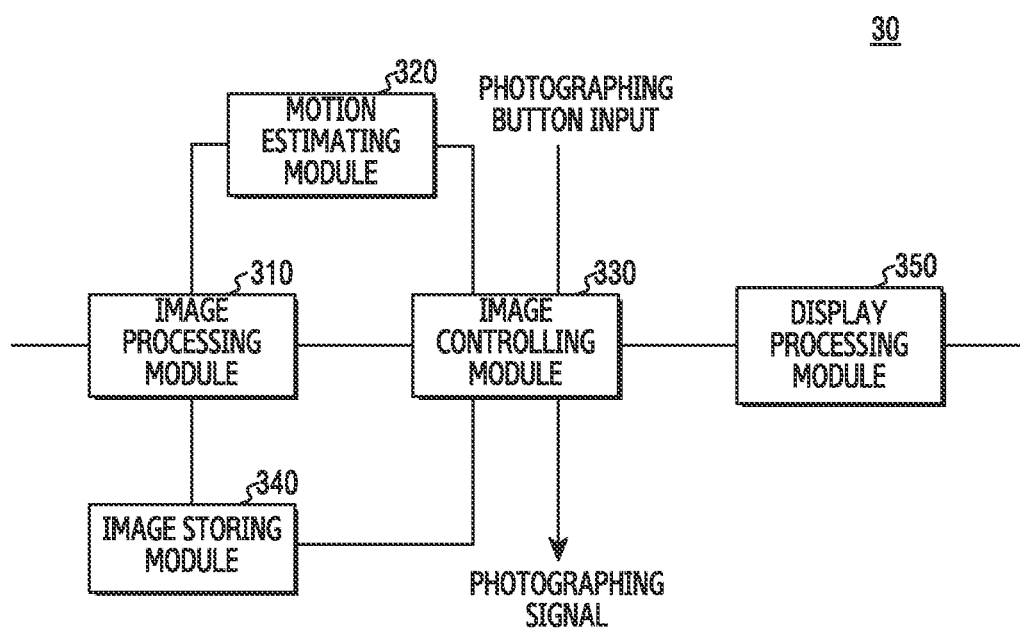
FIG. 3 is a diagram illustrating a construction of a device capturing an image in an electronic device according to an embodiment of the present disclosure.

FIG. 3 is a diagram illustrating a construction of a device 30 capturing an image in an electronic device according to an embodiment of the present disclosure. For example, the construction of FIG. 3 may be a function block construction. The function blocks may be program instructions stored in the memory 110, and the processor 100 may control operations of the function blocks.

Referring to FIG. 3, an image processing module (i.e., ISP) 310 may be a module processing an image that is acquired in a camera module (for example, the camera module 120 of FIG. 1). The image processing module 310 may be included in the camera module as well. The image processing module 310 may include an image pre-processing unit, an image post-processing unit, an encoder, a decoder, etc.

The image pre-processing operation of the image processing module 310 may perform auto white balance (AWB), auto exposure (AE), auto focusing (AF) extracting and processing, lens shading correction, dead pixel correction, knee correction, etc., for frame images (for example, pixel sizes of images corresponding to a resolution of the pixel array 230) that are acquired in the camera module.

The image post-processing operation of the image processing module 310 may include a color interpolator, an image processing chain (IPC), a color converter, etc. The image processing module 310 may perform a color interpolation operation for image-pre-processed sub frame images through the color interpolator, and perform noise cancellation, color correction, etc. for the color-interpolated sub frame images through the IPC, and convert RGB data into luminance-bandwidth-chrominance (YUV) data through the color converter. The image sensor may be a CCD or CMOS image sensor. The CCD/CMOS image sensor uses a color filter array. Due to this, each pixel sensor may have only one color among three colors for making a color image. The color interpolation operation may perform a function of converting (i.e., full color converting) colors of pixels outputted from the image sensor (for example, the image sensor 200 of FIG. 2) into colors including three colors: Red, Green, and Blue. The color interpolator may perform a color interpolation function, using a correlation between adjacent pixels. The IPC may perform noise reduction, gamma correction, luminance correction, etc. for color-interpolated images. And, the color converter may convert corrected images (for example, raw data and/or Bayer data) into YUV images. A post-processing operation of the image processing module 310 may be an operation of, after performing the color interpolation, the noise correction, etc. for the pre-processed images, converting the images into YUV images.

The image processing module 310 may encode image-processed frame images. The image processing module 310 may scale an image (for example, a full size image of the pixel array 230) that is generated in the camera module, to generate a preview image (or a live view image). Also, based on the processed image, the image processing module 310 may control (for example, AF, AE, AWB, IPC, face detection, object tracking, etc.) the camera module including the image sensor, and/or the image processing module 310.

An image storing module 340 may store, in a memory (for example, the memory 110 of FIG. 1), an image (for example, a captured image) processed in the image processing module 310. The image stored in the memory may be an encoded image or a non-encoded image.

A motion estimating module 320 may estimate a subject motion within an image that is outputted from the image processing module 310. The estimating of the motion of the subject may be conducted in various methods. First, the method of estimating the subject motion within the image may analyze continuous images to allocate a velocity vector to each pixel or region, and sense a group of pixels or regions having similar velocity vectors to estimate operation information about a moving subject. For example, the motion estimating module 320 may use a method of extracting a velocity vector from a point-to-point corresponding relationship, a method of tracking a moving subject based on features extracted from continuous $1^{st}$ image (for example, a previous-frame image) and $2^{nd}$ image (for example, a current-frame image), a method of tracking a moving subject by attempting matching between candidate regions using region information, a method of tracking a moving subject by measuring an optical flow using a restriction condition that a velocity vector change of each pixel within an image is gentle, etc. Second, the method of estimating the subject motion within the image may estimate the motion of the subject by analyzing difference images that are formed by a difference of gray-values between adjacent images. For example, the motion estimating module 320 may use a method of isolating a standstill region and an action region using a difference of gray-values between adjacent images, a method of merging a differential operation result and an edge operation result to detect action information of an object, a method of using a differential operation and an adaptive predictor, etc.

In an embodiment, the motion estimating module 320 of the electronic device may estimate a motion of a subject included in an image, based on an optical flow scheme.

An image controlling module 330 may perform a photographing mode that is selected by a user. The photographing mode may include a user-device photographing mode. The user-device photographing mode may represent a photographing mode of, in response to a user's capture request, capturing an image generated in the camera module and, if a condition that is set in the electronic device is recognized, automatically capturing an image generated in the camera module. If the user-device photographing mode is selected, the image controlling module 330 may drive the camera module, and may display a preview image generated in the image processing module 310 on a display through a display processing module 350. Also, the image controlling module 330 may display, on the display, a photographing button by which a user may generate a capture signal in the user-device photographing mode.

If the user-device photographing mode is selected, the image controlling module 330 may analyze the motion estimating module 320 and an input of the photographing button. If the input of the photographing button is recognized or a motion of a subject is detected in the motion estimating module 320, the image controlling module 330 may enable the image storing module 340 to store in the memory an image processed in the image processing module 310. Also, if the motion of the subject is detected in the motion estimating module 320, the image controlling module 330 may control the camera module to change a photographing interval time and/or an exposure time. In an embodiment, the image controlling module 330 may set the photographing interval time of the camera module faster and set the exposure time shorter. In an embodiment, if the motion of the subject is detected, the image controlling module 330 may control to capture an image automatically. Also, when capturing the image based on the motion detection, the image controlling module 330 may control to change the photographing interval time and/or exposure time of the camera module to be shorter and capture the image within a fast time. The image controlling module 330 may control the image storing module 340 to store the captured image in the memory.

The display processing module 350 may display a preview image and/or captured images on a display in the user-device photographing mode. The display processing module 350 may display in various forms in accordance with the type of the display. For example, the display may be configured as a single display or a multi-display (hereinafter, a dual display is described as an example). If the display is the single display, the display processing module 350 may display a preview image in accordance with a user's selection, and may display the preview image and thumbnail images of captured images together, and may display only the thumbnail images of the captured images. If the display is the dual display, the display processing module 350 may display thumbnail images of captured images on a $1^{st}$ display, and display a preview image on a $2^{nd}$ display.

When the display processing module 350 displays the captured images on the display, the display processing module 350 may distinguish and display an image manually captured by a user's selection and an image captured by the automatic photographing of the electronic device. In an embodiment, the display processing module 350 may add and display an icon image on an image manually captured by a user's selection, and may add and display each mutually different image on each of images captured by a user and the electronic device, and may add and display an icon image on an image automatically captured by the electronic device.

According to an embodiment of the present disclosure, if a user's photographing request signal is recognized, the electronic device may capture an image generated in the camera module and store the captured image in the memory. Also, if the electronic device recognizes that the motion estimating module 320 estimates a subject motion within an image, the electronic device may capture an image generated in the camera module and store the captured image in the memory.

The motion estimating module 320 may estimate a motion of a subject in various methods. According to an embodiment, the motion estimating module 320 may estimate the subject motion in an optical flow scheme. The optical flow may be said to be a distribution indicating how a brightness pattern has moved in an image. A motion estimating method of the optical flow scheme may be a method of estimating how subjects are seen in an image and how the subjects are moving. The optical flow may be obtained using continuous images (for example, a previous-frame image and a current-frame image). If the optical flow has been broken, the subject may be a mutually different subject. A pixel movement (i.e., motion) of an image is the same as a movement of a subject. If knowing a movement speed of the subject, one may know an optical flow of a corresponding pixel in the image as well.

The optical flow method may be a method of, by tracking to where pixels corresponding to a subject within an image are moved in continuous image frames, estimating a motion of the subject. For example, the optical flow method, one of methods of estimating the motion through a difference between continuous two frames, may be a scheme of gradually changing brightness, to express the vector direction and velocity of a subject motion generated in an image. The optical flow scheme may extract pattern motion information from continuous 2-dimensional images and, particularly, may extract a complicated motion well.

For example, the motion estimating module 320 of the optical flow method may acquire continuous images, and pre-process the acquired images, and estimate a motion of a subject based on the pre-processed images. The motion estimating module 320 may use continuous previous-frame (frame n−1) and current-frame (frame n) images. The motion estimating module 320 may pre-process a two-frame image into a gray image. In the pre-processing operation, the motion estimating module 320 may convert an RGB image into a gray scale image. The motion estimating module 320 may estimate a motion based on the converted gray scale image (i.e., a gray n−1 image and/or a gray n image). For example, the motion estimating module 320 may process a continuous-two-frame image in a horn-schuck (HS) technique and/or an HS or combined local-global (CLG) technique, to obtain motion information (i.e., a motion vector). The CLG technique may be a method combining a method that is strong against an HS density flow field and a lucas-kanade (LK) noise.

If there is a motion of a subject within an image, the motion estimating module 320 may detect the motion (i.e., a motion vector) of the subject.

If a motion vector is detected (i.e., if a motion of a subject is estimated) in the motion estimating module 320, the image controlling module 330 may automatically capture an image generated in the camera module. That the motion of the subject is detected may represent that the subject photographed through the camera module is moving. According to an embodiment of the present disclosure, if the subject moves, the electronic device may control the camera module to make a photographing interval time fast during the time for which the subject moves, in order to capture images according to a motion of the subject. For this, the image controlling module 330 may control the image photographing interval time and/or exposure time of the camera module. If the motion of the subject is detected, the image controlling module 330 may control the photographing interval time of the camera module fast, and may control a timing control unit (for example, the timing control unit 210 of FIG. 2) to generate a control signal for making short the exposure time of an image sensor (for example, the image sensor 200 of FIG. 2). For example, if the motion of the subject is detected, the electronic device may, similarly to a burst photographing method, control the photographing interval time of the camera module fast during the time for which the motion of the subject is recognized.

While a subject moves, the electronic device may capture images fast. Due to this, the electronic device may capture images having the same motion. The image controlling module 330 may analyze images that are automatically photographed based on a motion of the subject, and store the optimal number of images. For the sake of this, the image controlling module 330 may analyze captured images, and group images having similar motions. The image controlling module 330 may filter the grouped images to select images. For example, the image controlling module 330 may eliminate blur images, too dark or bright images, and/or images not including a part of a subject (for example, images in which the subject deviates from a camera angle) among the grouped images. The image controlling module 330 may select images in which motions are not repeated among the filtered images. Also, the image controlling module 330 may display the filtered images as suggestion images on a display through the display processing module 350, and may store images that are selected by a user. When a screen of the display is refreshed, the image controlling module 330 may store only the set number of images (for example, one suggestion image) per image group through the image storing module 340, and eliminate the remnant from a buffer (for example, an internal buffer or the processor 100 or a specific region of the memory 110).

The display processing module 350 may display captured images on the display based on the user-device photographing mode by the control of the image controlling module 330. The display processing module 350 may display the captured images based on the type of the display (for example, the single display or the dual display).

Figure 4A:
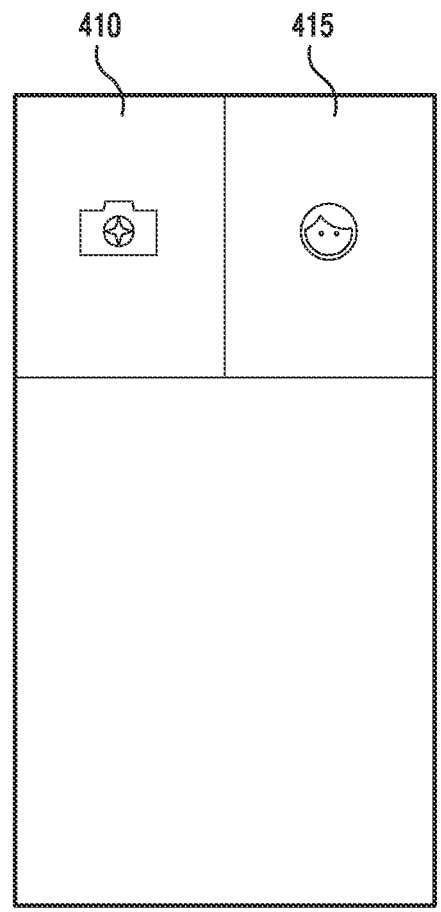
FIGS. 4A, 4B, and 4C are diagrams illustrating a display example of when a user-device photographing mode is executed in an electronic device according to various embodiments of the present disclosure.
Figure 4B:
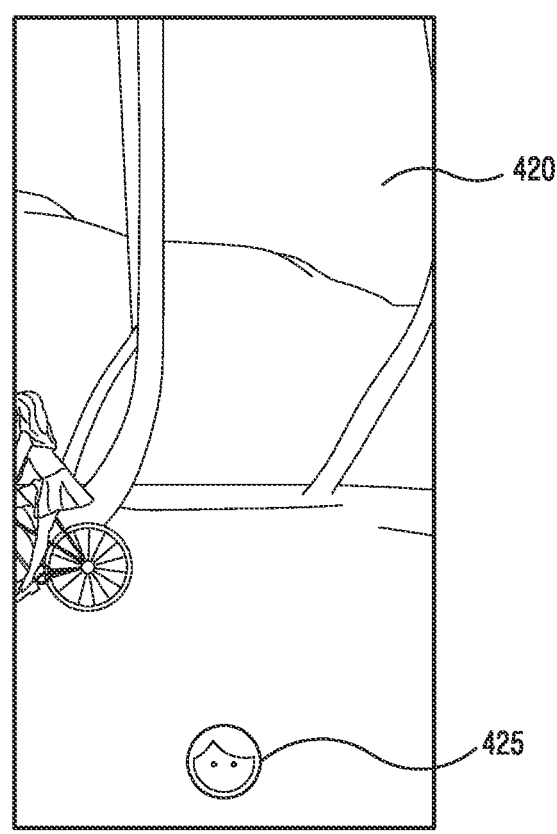
Figure 4C:
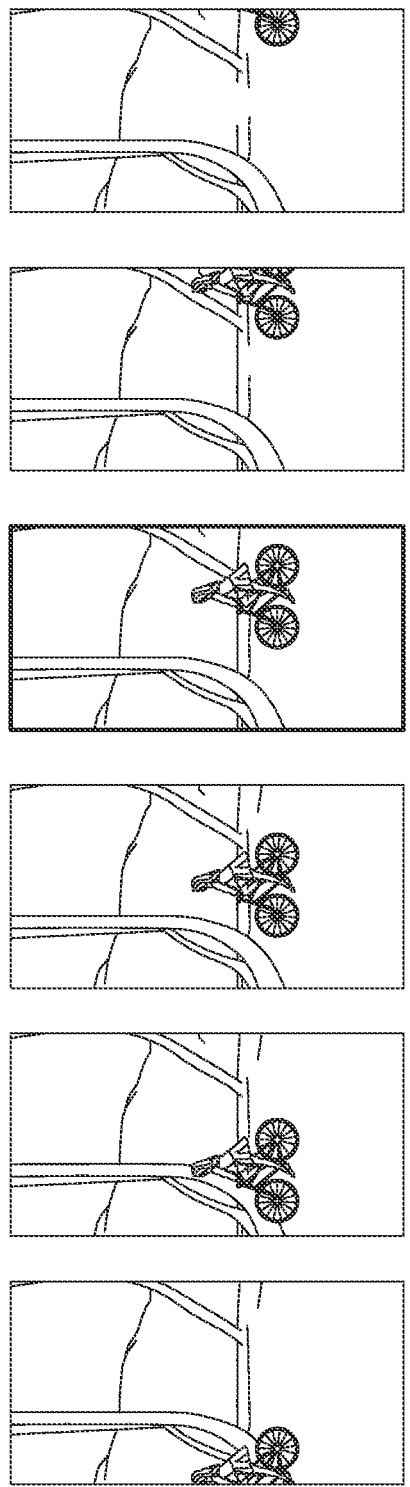

FIGS. 4A, 4B, and 4C are diagrams illustrating a display example of when a user-device photographing mode is executed in an electronic device according to various embodiments of the present disclosure.

Referring to FIGS. 4A, 4B, and 4C, if a user selects a photographing mode, the electronic device may, as illustrated in FIG. 4A, display a mode type in which the electronic device can photograph. In FIG. 4A, an icon 410 may be an icon image for selecting a normal photographing mode (for example, photographing by a user's selection), and an icon 415 may be an icon image for selecting a user-device photographing mode according to an embodiment of the present disclosure. If the user selects the icon 415 of FIG. 4A, the processor (for example, the processor 100 of FIG. 1) may recognize this and enable a camera module (for example, the camera module 120 of FIG. 1). As illustrated in FIG. 4B, the processor may display a preview image 420 that is generated by processing an image generated in the camera module, on the display (for example, the display 150 of FIG. 1). As illustrated in FIG. 4B, the processor may display a photographing button 425 in a partial area of a screen in which the preview image 420 is displayed (for example, a lower display area of the preview image). If the photographing button 425 is selected, the processor may capture an image according to a user's selection.

In a state in which the preview image 420 is displayed as in FIG. 4B, if a motion of a subject is estimated, the processor may control a photographing interval time of the camera module fast while continuously automatically capturing images including a moving subject as in FIG. 4C. For example, if the motion of the subject is detected, the processor may change a photographing speed (for example, available maximum photographing interval time and minimum exposure time) of the camera module, and continuously capture images during the time for which the motion of the subject is detected. The processor may capture an image by the same operation, even when detecting a motion of the electronic device and/or recognizing an emotion change of the subject besides detecting the motion of the subject.

FIGS. 5A, 5B, 5C, 5D, 5E, and 5F are diagrams illustrating a screen display example of a single display in an electronic device according to various embodiments of the present disclosure.

Figure 5A:
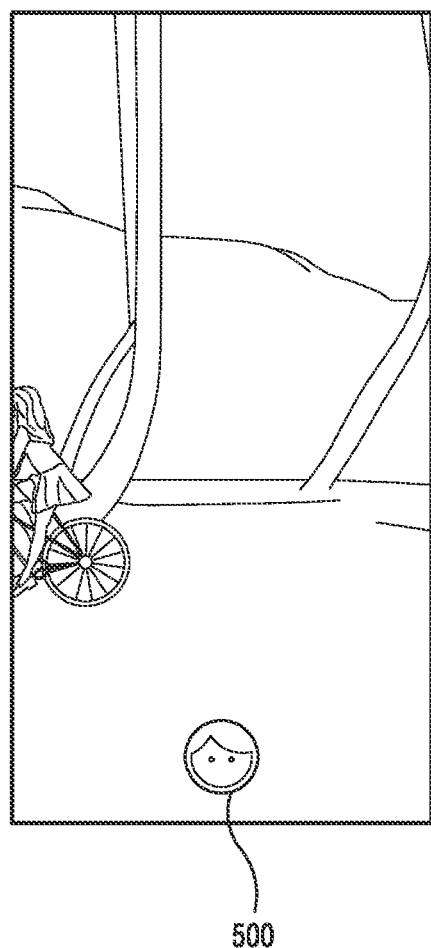
FIGS. 5A, 5B, 5C, 5D, 5E, and 5F are diagrams illustrating a screen display with a single display in an electronic device according to various embodiments of the present disclosure.
Figure 5B:
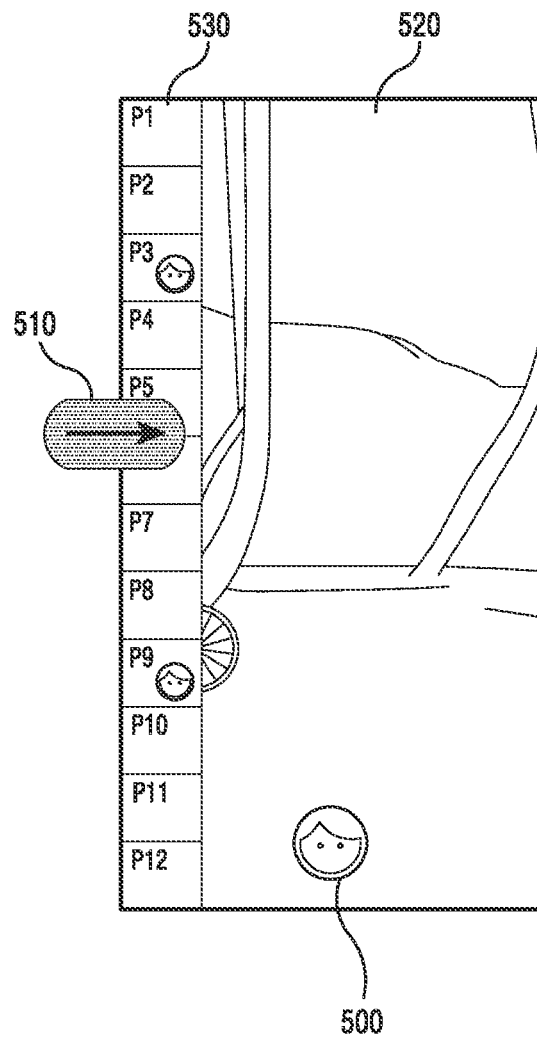

Referring to FIGS. 5A, 5B, 5C, 5E, and 5F, if a display is a single display, the electronic device may, as in FIG. 5A, display a preview image on the display (for example, the display 150 of FIG. 1) in a device-user photographing mode. If a user generates a $1^{st}$ input 510 in process of displaying the preview image as in FIG. 5A, the electronic device may, as in FIG. 5B, display the preview image in a $1^{st}$ area 520 of the display, and display thumbnail images (for example, P1-P12 in FIG. 5B) of captured images in a $2^{nd}$ area 530. For example, the $1^{st}$ input 510 may be a gesture input and may be a swipe input. FIG. 5B illustrates an example in which the $1^{st}$ input 510 is a gesture input that is swiped from an edge area of the display to a screen display area of the display. For example, the $2^{nd}$ area 530 displaying thumbnail images of images automatically captured by the electronic device may be the edge area of the display, and the $1^{st}$ area 520 displaying the preview image may be the remnant area of the display excepting the $2^{nd}$ area 530.

Figure 5C:
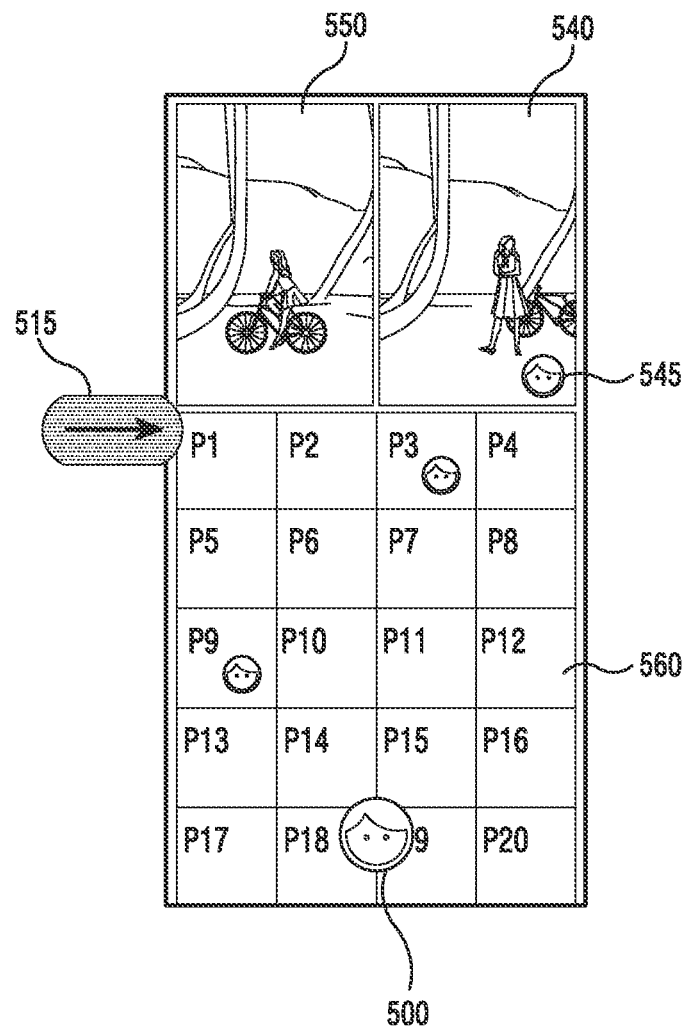

If the user generates a $2^{nd}$ input 515, the electronic device may, as in FIG. 5C, display captured images as thumbnail images in the whole area of the display. For example, the $2^{nd}$ input 515 may be a gesture input and may be a swipe input. FIG. 5C illustrates an example of a gesture input that is swiped from the $2^{nd}$ area 530 of the display to the screen display area of the display in a state in which the thumbnail images of the images automatically captured by the electronic device are displayed in the $2^{nd}$ area 530. In case where the electronic device displays the captured thumbnail images in the whole area by the $2^{nd}$ input 515, the electronic device may display the latest thumbnail image manually captured by a user's selection in a $1^{st}$ specific area 540 of the display, and display the latest thumbnail image automatically captured by a motion of a subject in a $2^{nd}$ specific area 550, and may display thumbnail images (for example, P1-P20 in FIG. 5C) of images captured by a user's selection and/or the electronic device in a $3^{rd}$ specific area 560 in a grid type.

At this time, the thumbnail images displayed as in FIG. 5C may be images manually captured by a user's selection and images automatically captured by a motion of a subject, etc. When the electronic device displays captured images as thumbnail images, the electronic device may distinguish and display the images manually captured by the user's selection or the images automatically captured by the electronic device. In an embodiment, the electronic device may add and display icon images on the images manually selected by a user, and may not display icon images on the images automatically captured by the electronic device. In an embodiment, the electronic device may add and display a $1^{st}$ icon image on the image manually selected by the user, and may display a $2^{nd}$ icon image distinguished from the $1^{st}$ icon image on the image automatically captured by the electronic device. In an embodiment, the electronic device may add and display an icon image on the image automatically captured by the electronic device, and may not display an icon image on the image manually selected by the user. For example, FIG. 5C illustrates an example of adding and displaying an icon image 545 on the image manually captured by the user, and not displaying an icon image on the image automatically captured by the electronic device.

Figure 5D:
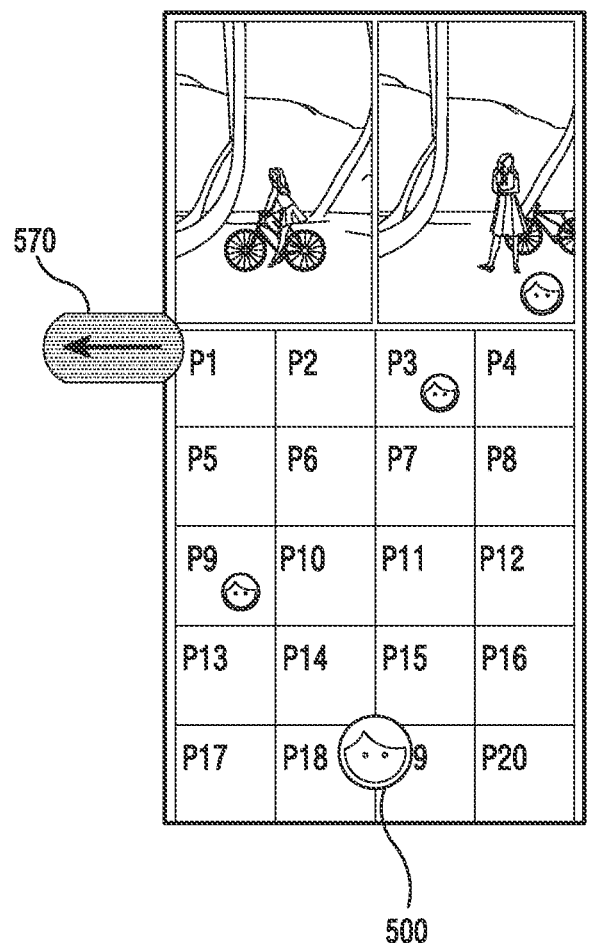
Figure 5E:
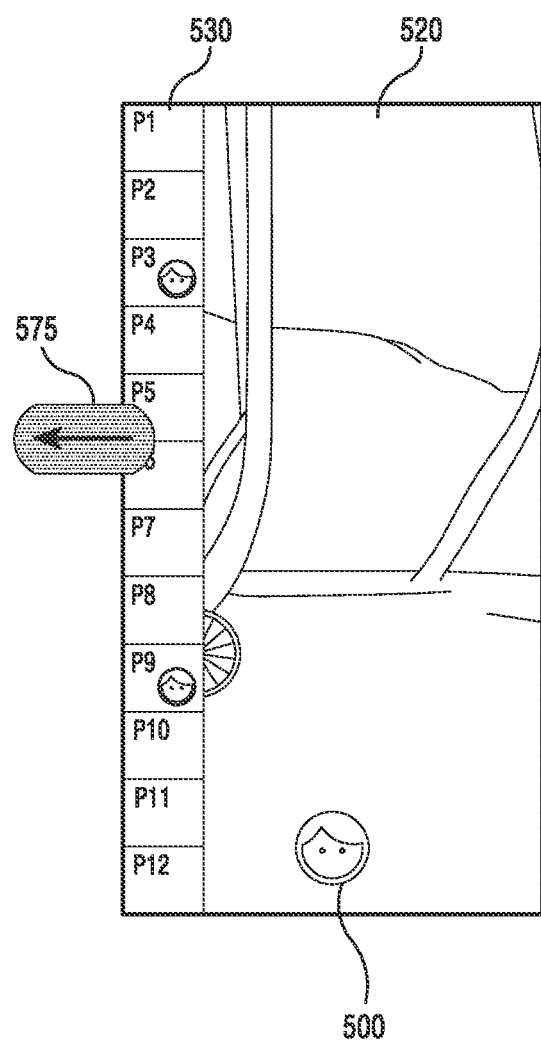

If the user generates a $3^{rd}$ input 570, as in FIG. 5D, in a state of displaying the captured image as the thumbnail image, the electronic device may, as in FIG. 5E, display a preview image in the $1^{st}$ area 520, and display the thumbnail images of the captured images in the $2^{nd}$ area 530. The $3^{rd}$ input 570 may be a swipe input that is conducted in the reverse direction of the $2^{nd}$ input 515. If a $4^{th}$ input 575 is generated in a state of displaying the preview image in the $1^{st}$ area 520 and displaying the thumbnail images of the captured images in the $2^{nd}$ area 530, as in FIG. 5E, the electronic device may display the preview image in the whole display as in FIG. 5F. The $4^{th}$ input 575 may be a swipe input that is conducted in the reverse direction of the $1^{st}$ input 510.

Figure 5F:
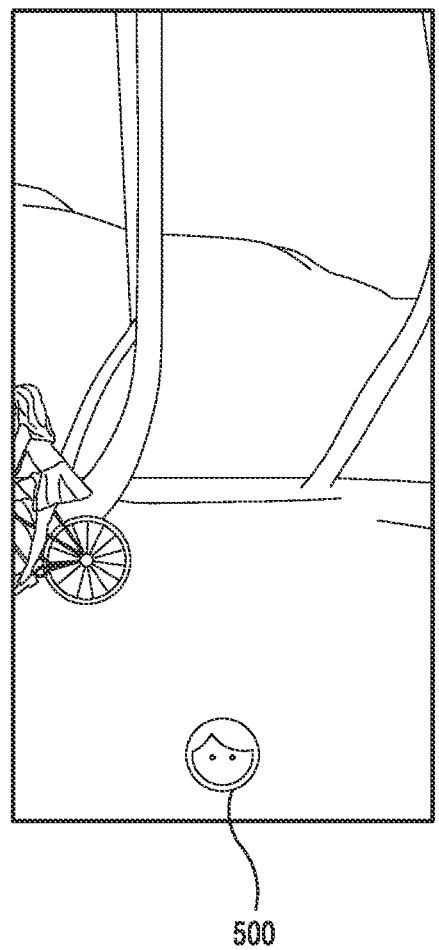

Also, if the electronic device detects a motion (for example, detects a motion of a subject, a motion of the device, an emotion change of the subject, etc.) in a state of displaying the preview image as in FIG. 5A or FIG. 5F, the electronic device may display that an image is automatically captured by the electronic device. For example, the electronic device may display a trajectory of the motion of the subject on a screen of the display.

As in FIGS. 5A, 5B, 5C, 5D, 5E, and 5F, a photographing button 500 may be displayed on the screen of the display 150 displaying an image. If the user touches the photographing button 500, the electronic device may recognize that it is a user's selection, and capture an image generated in the camera module. When the electronic device captures the image by the user's selection, the electronic device may capture the image with a set photographing interval time and/or exposure time.

Figure 6A:
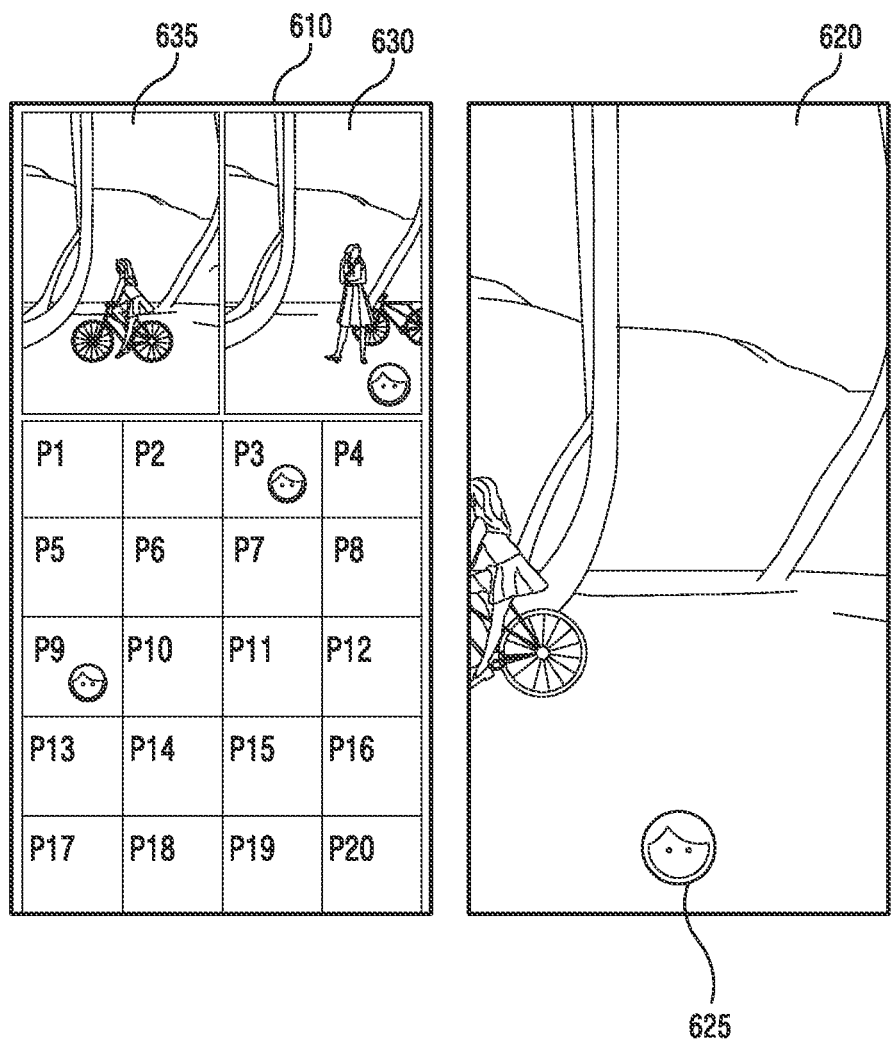
FIGS. 6A and 6B are diagrams illustrating a screen display example of a dual display in an electronic device according to various embodiments of the present disclosure.
Figure 6B:
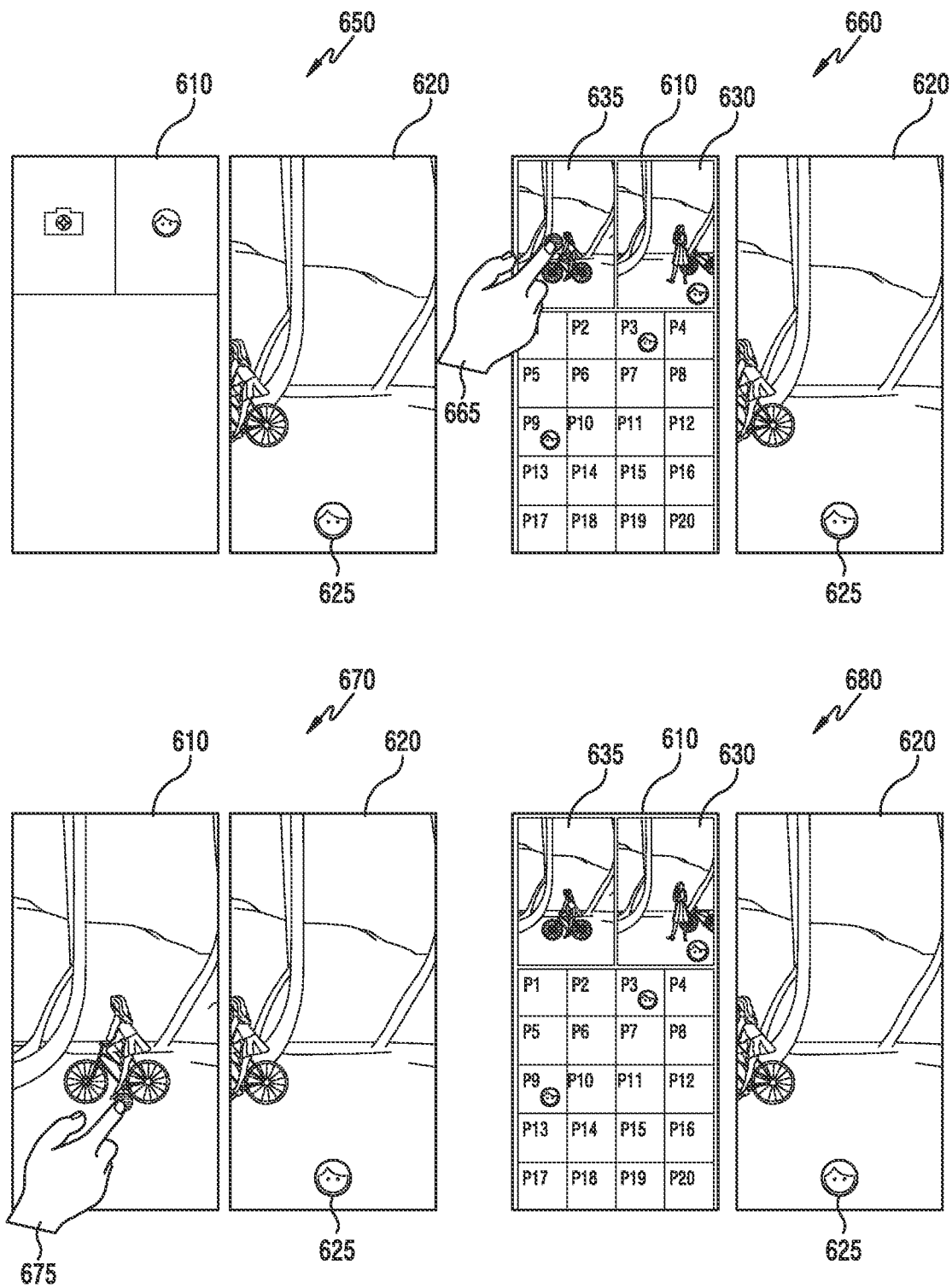

FIGS. 6A and 6B are diagrams illustrating a screen display example of a dual display in an electronic device according to an embodiment of the present disclosure.

Referring to FIG. 6A, the electronic device may include a $1^{st}$ display 610 and a $2^{nd}$ display 620. In case where a display is a dual display having the $1^{st}$ display 610 and the $2^{nd}$ display 620, the electronic device may display a preview image on the $2^{nd}$ display 620, and display thumbnail images of images captured by a user and the electronic device on the $1^{st}$ display 610. Also, a photographing button 625 for capturing an image by a user's selection may be displayed on the $2^{nd}$ display 620.

The thumbnail images displayed on the $1^{st}$ display 610 may be images manually captured by a user's selection and images automatically captured by a motion of a subject, etc. In case where the electronic device displays the captured thumbnail images on the $1^{st}$ display 610, the electronic device may display the latest thumbnail image manually captured by the user's selection in a $1^{st}$ specific area 630 of the $1^{st}$ display 610, and display the latest thumbnail image automatically captured by the motion of the subject in a $2^{nd}$ specific area 635. When the electronic device displays the captured images as the thumbnail images, the electronic device may distinguish and display the images manually captured by the user's selection or images automatically captured by the electronic device. The thumbnail image displayed on the $1^{st}$ display 610 of FIG. 6A illustrates an example of adding and displaying an icon image on an image manually captured by a user, and not displaying an icon image on an image automatically captured by the electronic device.

Referring to FIG. 6B, the electronic device may display screen 650 for setting a user-device photographing mode. If a button (e.g., icon 415 of FIG. 4A) for executing the user-device photographing mode is selected, the electronic device may, as in screen 660, display thumbnail images of captured images on the $1^{st}$ display 610 and display, as a preview image, an image outputted from the camera module on the $2^{nd}$ display 620. The electronic device may display the latest image manually captured by a user's selection in the $1^{st}$ specific area 630 of the $1^{st}$ display 610, and display the latest image automatically photographed by the electronic device in the $2^{nd}$ specific area 635, and may display thumbnail images captured by the user's selection and/or the electronic device in the remnant area. If the user selects the thumbnail image as denoted by reference numeral 665 among the thumbnail images displayed on the $1^{st}$ display 610, the electronic device may display an image corresponding to the selected thumbnail image on the $1^{st}$ display 610, as in screen 670. Also, if the user selects the $1^{st}$ display 610, as denoted by reference numeral 675 in process of displaying the selected captured image as in screen 670, the electronic device may display the captured thumbnail images on the 1$^{st}$ display 610 as in screen 680.

Also, if the electronic device detects a motion (i.e., a motion of a subject, a motion of the device, an emotion change of the subject, etc.) in a state of displaying the thumbnail images and the preview image, as in screen 660 and screen 680, the electronic device may display an operation of automatically capturing an image by the electronic device on the 2$^{nd}$ display 620 as well.

Figure 7:
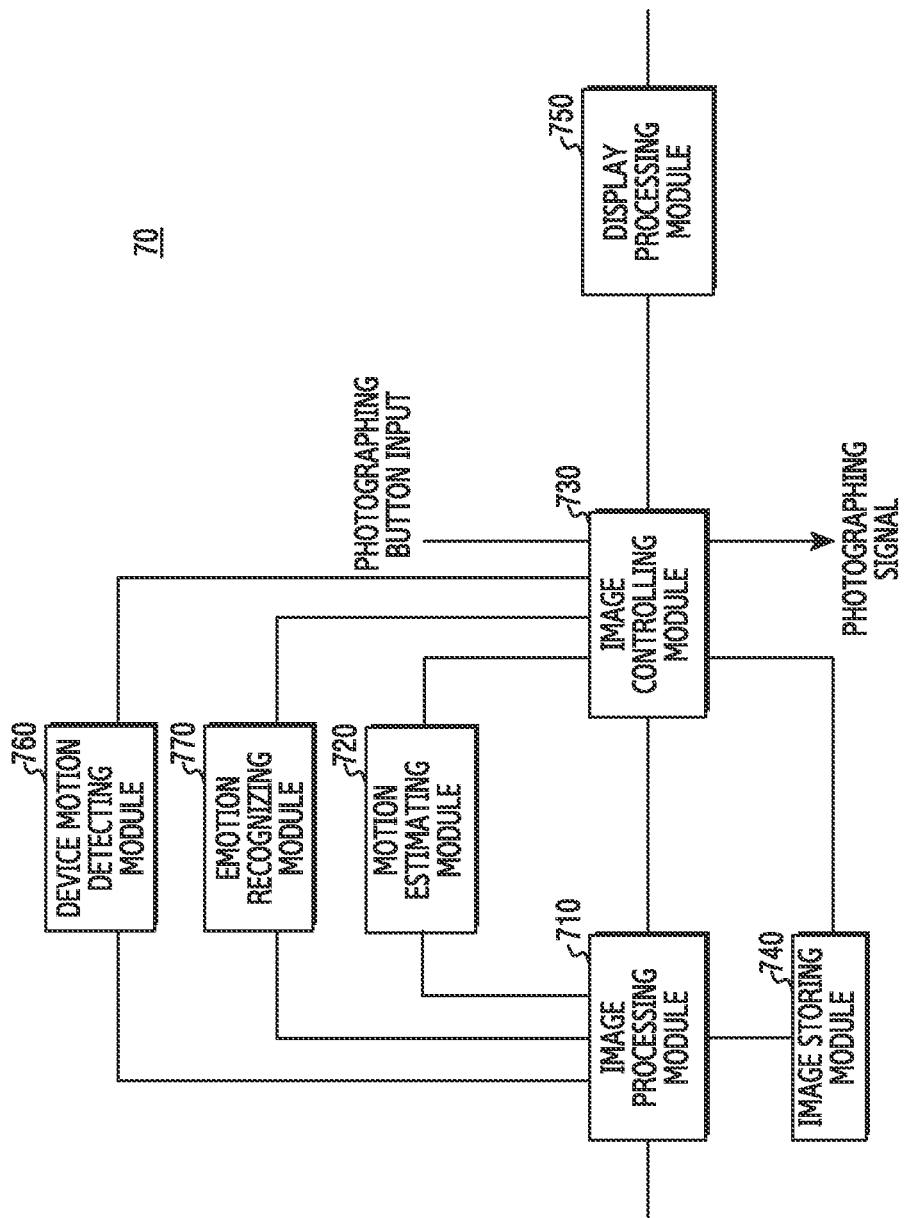
FIG. 7 is a diagram illustrating another construction of a device acquiring an image in an electronic device according to an embodiment of the present disclosure.

FIG. 7 is a diagram illustrating another construction of a device 70 acquiring an image in an electronic device according to an embodiment of the present disclosure. For example, the construction of FIG. 7 may be a function block construction. The function blocks may be program instructions stored in a memory (for example, the memory 110 of FIG. 1), and operations of the function blocks may be controlled by a processor.

Referring to FIG. 7, an image processing module (i.e., ISP) 710 may be a module processing an image that is acquired by a camera module (for example, the camera module 120 of FIG. 1). The image processing module 710 may be included in the camera module as well. The image processing module 710 may include an image pre-processing unit, an image post-processing unit, an encoder, a decoder, etc.

The image pre-processing unit of the image processing module 710 may perform auto white balance (AWB), auto exposure (AE), auto focusing (AF) extracting and processing, lens shading correction, dead pixel correction, knee correction, etc., for frame images (for example, pixel sizes of images corresponding to a resolution of the pixel array 230) acquired by the camera module. The image post-processing unit of the image processing module 710 may perform a color interpolation operation for image-pre-processed sub frame images through a color interpolator, and perform noise cancellation, color correction, etc. for the color-interpolated sub frame images through an IPC, and convert RGB data into YUV (or luminance-chroma_blue-chroma_red (YCbCr)) data through a color converter.

The image processing module 710 may encode image-processed frame images. The image processing module 710 may scale an image (for example, a full size image of the pixel array 230) generated in the camera module, and generate the image as a preview image (or a live image). Also, based on the processed image, the image processing module 710 may control (for example, AF, AE, AWB, IPC, face detection, object tracking, etc.) the camera module including the image sensor and/or the image processing module 710.

An image storing module 740 may store, in a memory, an image that is processed (for example, captured) in the image processing module 710. The image stored in the memory may be an encoded image or a non-encoded image.

A motion estimating module 720 may estimate a subject motion within an image that is outputted from the image processing module 710. The estimating of the subject motion may be conducted in various methods. First, the method of estimating the subject motion within the image may analyze continuous images to allocate a velocity vector to each pixel or region, and sense a group of pixels or regions having similar velocity vectors to estimate operation information about a moving subject. For example, the motion estimating module 720 may use a method of extracting a velocity vector from a point-to-point corresponding relationship, a method of tracking a moving subject based on features extracted from continuous 1$^{st}$ image (for example, a previous-frame image) and 2$^{nd}$ image (for example, a current-frame image), a method of tracking a moving subject by attempting matching between candidate regions using region information, a method of tracking a moving subject by measuring an optical flow using a restriction condition that a velocity vector change of each pixel within an image is gentle, etc. Second, the method of estimating the subject motion within the image may estimate the motion of the subject by analyzing difference images that are formed by a difference of gray-values between adjacent images. For example, the motion estimating module 720 may use a method of isolating a standstill region and an action region using a difference of gray-values between adjacent images, a method of merging a differential operation result and an edge operation result to detect action information of an object, a method of using a differential operation and an adaptive predictor, etc.

In an embodiment, the motion estimating module 720 of the electronic device may estimate a motion of a subject included in an image based on an optical flow scheme.

A device motion detecting module 760 may analyze an output of a sensor module (for example, the sensor module 130 of FIG. 1), to detect a motion of the device. The device motion detecting module 760 may analyze an output of an acceleration sensor and/or a gyro sensor of the sensor module 130, to analyze a motion of the electronic device.

When a user takes a photo, the user may move the electronic device while photographing. For example, the user may take a panorama shot, a tilting shot, a zooming shot, etc., and also may move the electronic device while photographing as in a running car. The panorama shot may be a method of moving the electronic device horizontally in the direction of 360 degrees while photographing. The tilting shot may be a method of tilting the electronic device up and down while photographing. The zooming shot may be a photographing method of zooming in and out a lens so as to contain a subject in one camera angle or exactly express a look or important appearance of a subject that is far away. The movement photographing may be a method of moving the electronic device mounted in a transportation means (for example, a car, a bicycle, a drone, a cart, etc.) while photographing.

The user may move the electronic device while performing various photographing actions. The device motion detecting module 760 may analyze an output of an acceleration sensor and/or a gyro sensor of a sensor module, to detect a horizontal motion, a vertical motion, a rotation motion, etc. of the electronic device in a user-device photographing mode. If a motion of the device is detected in the user-device photographing mode, the device motion detecting module 760 may generate an image capture request signal.

An emotion recognizing module 770 may analyze an acquired feature of a subject, to recognize an emotion change of the subject. The subject may be persons, pets, etc. The emotion recognition may be one of the most important factors of a human-to-machine interface. An emotion recognition technology may extract a feature mainly using a face image, a voice and/or a bio signal and classify this into each emotion category through a previously learned recognition model. The emotion recognizing module 770 according to various embodiments of the present disclosure may analyze a face image of a subject, to recognize the emotion (for example, anger, happiness, sadness, fear, grief, surprise, etc.) of the subject.

An emotion recognition method using a face image of a subject may be a method of sensing a facial look of a user and a motion of the human body in an image (i.e., a still image or a video) and according to this, figuring out an emotion state of the user. A method of recognizing the facial look may use an image based recognition method of directly classifying an emotion from a face image, or a model based recognition method of mapping a face image to a facial muscle action. The image based recognition method may be a method of recognizing the facial look using a brightness value of the whole face image. The model based recognition method may be a method of detecting a feature in a face image, and figuring out a facial muscle action to recognize the facial look.

The emotion recognizing module 770 according to various embodiments of the present disclosure may use the image based recognition method. For example, the emotion recognizing module 770 may use an emotion recognition method being based on the Adaboost algorithm (facial look recognition by Adaboost).

The emotion recognizing module 770 may detect and extract a face portion from an acquired image, and may perform a pre-processing operation (for example, re-sizing, histogram equalization, etc.) for recognizing an emotion using the extracted face image. Thereafter, the emotion recognizing module 770 may execute the Adaboost algorithm for the pre-processed face image, to recognize the emotion. The Adaboost algorithm may include various types of emotion classifiers (for example, a neutral strong classifier, a happy strong classifier, a sad strong classifier, an angry strong classifier, a surprise strong classifier, etc.). The Adaboost algorithm may output a high value among corresponding emotion values for a face image of a learned look.

According to an embodiment, the emotion recognizing module 770 may detect a position and size of a face from an image by the Adaboost algorithm, and may obtain an output value by look from the detected face image, using the Adaboost strong classifier that is learned on a per-look basis. The emotion recognizing module 770 may set, as a recognized emotion, an emotion corresponding to the highest value among the output values of the Adaboost strong classifier. The emotion recognizing module 770 may extract a face image to recognize the emotion of the user. If the recognized emotion is changed, the emotion recognizing module 770 may generate a signal for automatic photographing. For example, the emotion recognizing module 770 may analyze the output value of the Adaboost strong classifier, to recognize the emotion of the user. If a change of the emotion (for example, a change from neutral to happy, a change from happy to sad, a change from happy to surprise, etc.) is recognized, the emotion recognizing module 770 may generate an image capture request signal. Also, if a specific emotion is recognized (for example, happy), the emotion recognizing module 770 may generate an image capture request signal.

An image controlling module 730 may perform a photographing mode that is selected by a user. The photographing mode may include a user-device photographing mode. The user-device photographing mode may represent a photographing mode of capturing an image generated in a camera module in response to a user's capture request, and automatically capturing an image generated in the camera module if a set condition is recognized in the electronic device. If the user-device photographing mode is selected, the image controlling module 730 may drive the camera module, and may display a preview image generated in the image processing module 710 on a display through a display processing module 750. Also, the image controlling module 730 may display, on the display, a photographing button by which the user may generate a capture signal in the user-device photographing mode. Also, if the user-device photographing mode is set, the image controlling module 730 may enable at least one module among the motion estimating module 720, the device motion detecting module 760 and/or the emotion recognizing module 770.

If the user-device photographing mode is selected, the image controlling module 730 may analyze the motion estimating module 720, the device motion detecting module 760, the emotion recognizing module 770, and an input of the photographing button. If the input of the photographing button is recognized or an image capture request signal is generated in the motion estimating module 720, the device motion detecting module 760 or the emotion recognizing module 770, the image controlling module 730 may enable the image storing module 740 to store an image processed in the image processing module 710 in a memory.

Also, if an image capture request signal is generated in the motion estimating module 720, the device motion detecting module 760 or the emotion recognizing module 770, the image controlling module 730 may control the camera module to change a photographing interval time and/or an exposure time. In an embodiment, the image controlling module 730 may set the photographing interval time of the camera module faster, and set the exposure time shorter. In an embodiment, if a motion of a subject is detected, the image controlling module 730 may control to automatically capture an image. Also, when capturing the image based on the motion detection, the image controlling module 730 may control to change the photographing interval time and/or exposure time of the camera module to be short and capture the image within a fast time. The image controlling module 730 may control the image storing module 740 to store the captured image in the memory.

The display processing module 750 may display a preview image and/or captured images on the display in the user-device photographing mode. The display processing module 750 may display the preview image and/or the captured images in various forms in accordance with the type of the display. For example, the display may be constructed as a single display or a multi-display (hereinafter, a 'dual display' is described as an example). If the display is the single display, the display processing module 750 may display a preview image as in FIG. 5A, and may display the preview image and thumbnail images of captured images together as in FIG. 5B, and may display only the thumbnail images of the captured images as in FIG. 5C. If the display is the dual display, the display processing module 750 may display thumbnail images of captured images on the $1^{st}$ display and display a preview image on the $2^{nd}$ display as in FIG. 6A.

When displaying the captured images on the display, the display processing module 750 may distinguish and display an image manually captured by a user's selection and an image captured by the automatic photographing of the electronic device. In an embodiment, the display processing module 750 may add and display an icon image on the image manually captured by the user's selection, and may add and display each mutually different image on each image captured by a user and the electronic device, and may add and display an icon image on an image automatically captured by the electronic device.

According to various embodiments of the present disclosure, if a user's photographing request signal is recognized, the electronic device may capture an image generated in the camera module and store the captured image in the memory. Also, if the motion estimating module 720 estimates a subject motion within an image, or the device motion detecting module 760 detects a motion of the electronic device, or the emotion recognizing module 770 recognizes an emotion change of a subject (e.g., person), the electronic device may capture an image outputted from the camera module and store the captured image in the memory.

The motion estimating module 720 may estimate a motion of a subject in the same method as that of the motion estimating module 320 of FIG. 3. If the motion estimating module 720 detects a subject motion within an image, the motion estimating module 720 may generate an image capture request signal. The device motion detecting module 760 may detect a motion of the electronic device according to an operation of moving the electronic device while photographing (e.g., a panorama shot, a tilting shot, a moving shot, etc.). If the motion of the electronic device is detected, the device motion detecting module 760 may generate an image capture request signal. The emotion recognizing module 770 may analyze a subject within an image, to recognize an emotion change or a specific emotion state. If the specific emotion state or the emotion change is recognized, the emotion recognizing module 770 may generate an image capture request signal.

If a selection of a photographing button is recognized, the image controlling module 730 may set the camera module to a $1^{st}$ photographing condition. If an image capture request signal is generated in the motion estimating module 720, the image controlling module 730 may set the camera module to a $2^{nd}$ photographing condition. The $2^{nd}$ photographing condition may be set variably based on a movement speed of a recognized subject. Also, the $2^{nd}$ photographing condition may be set as a fixed value. If an image capture request signal is generated in the device motion detecting module 760, the image controlling module 730 may set the camera module to a $3^{rd}$ photographing condition. The $3^{rd}$ photographing condition may be set variably based on a movement speed of the electronic device. Also, the $3^{rd}$ photographing condition may be set as a fixed value. If an image capture request signal is generated in the emotion recognizing module 770, the image controlling module 730 may set the camera module 120 to a $4^{th}$ photographing condition. The $4^{th}$ photographing condition may be set variably based on a recognized emotion change speed. Also, the $4^{th}$ photographing condition may be set as a fixed value.

The $2^{nd}$ photographing condition to the $4^{th}$ photographing condition may have mutually different time values (i.e., photographing time and/or exposure time), or may have the same time value. The $2^{nd}$ photographing condition to the $4^{th}$ photographing condition may have relatively faster photographing interval time and/or shorter exposure time, compared to the $1^{st}$ photographing condition. The image controlling module 730 may set a photographing condition, based on a combination of at least two of the $1^{st}$ photographing condition to the $4^{th}$ photographing condition.

If an image capture request signal is generated in the motion estimating module 720, the device motion detecting module 760 or the emotion recognizing module 770, the image controlling module 730 may control the camera module based on a set condition, and control to capture an image processed in the image processing module 710 and store the captured image in the memory.

The image controlling module 730 may analyze automatically photographed images and store the optimal number of images. For the sake of this, the image controlling module 730 may analyze captured images, to group images having similar motions. The image controlling module 730 may filter the grouped images, to select images. For example, the image controlling module 730 may eliminate blur images, too dark or bright images, and/or images not including a part of a subject (for example, images in which the subject deviates from a camera angle) among the grouped images. The image controlling module 730 may select images in which motions are not repeated among the filtered images. Also, the image controlling module 730 may display the filtered images as suggestion images on a display through the display processing module 750, and may store images manually selected by a user. When a screen of the display is refreshed, the image controlling module 730 may store only the set number of images (for example, one suggestion image) per image group through the image storing module 740, and eliminate the remnant from a buffer (for example, an internal buffer or the processor 100 or a specific region of the memory 110).

An electronic device according to various embodiments of the present disclosure may include a camera, a display, a processor electrically coupled with the camera and the display, and a memory electrically coupled with the processor. The memory may be configured to store instructions which, when executed, instruct the processor to, when a photographing request signal is received, estimate a motion of a subject within an image that is acquired by the camera, when the motion of the subject within the image acquired by the camera is not recognized, control the camera to capture a $1^{st}$ type image by applying a $1^{st}$ photographing condition, and when the motion of the subject within the image acquired by the camera is recognized, control the camera to capture a $2^{nd}$ type image by applying a $2^{nd}$ photographing condition.

According to various embodiments, the $1^{st}$ and $2^{nd}$ photographing conditions may include at least one of a photographing interval time or an exposure time, and the $2^{nd}$ photographing condition may have at least one of a shorter interval time or exposure time than the $1^{st}$ photographing condition.

According to various embodiments, the device may further include a sensor configured to detect a motion of the electronic device, and the instructions may further instruct the processor to, when the motion of the electronic device is detected through the sensor, control the camera to capture a $3^{rd}$ type image by applying a $3^{rd}$ photographing condition.

According to various embodiments, the instructions may further instruct the processor to, when an emotion change of the subject within the photographed image is recognized, control the camera to capture a $4^{th}$ type image by applying a $4^{th}$ photographing condition.

According to various embodiments, the instructions may instruct the processor to group images that are similar among the captured images, filter the grouped images to suggest suggestion images comprising a set number of images, and store the captured images and the suggestion images.

According to various embodiments, the filtered images may include blur images.

According to various embodiments, the instructions may further instruct the processor to display a preview image in a photographing mode, and based on a user's input, display the preview image in a $1^{st}$ area of the display and display thumbnail images of captured images in a $2^{nd}$ area of the display.

According to various embodiments, the $2^{nd}$ area may be an edge area of the display.

According to various embodiments, the instructions may further instruct the processor to, based on a user's input, display the thumbnail images of the captured images on the display, and distinguish and display images captured by one of a user's selection or the electronic device.

Figure 8:
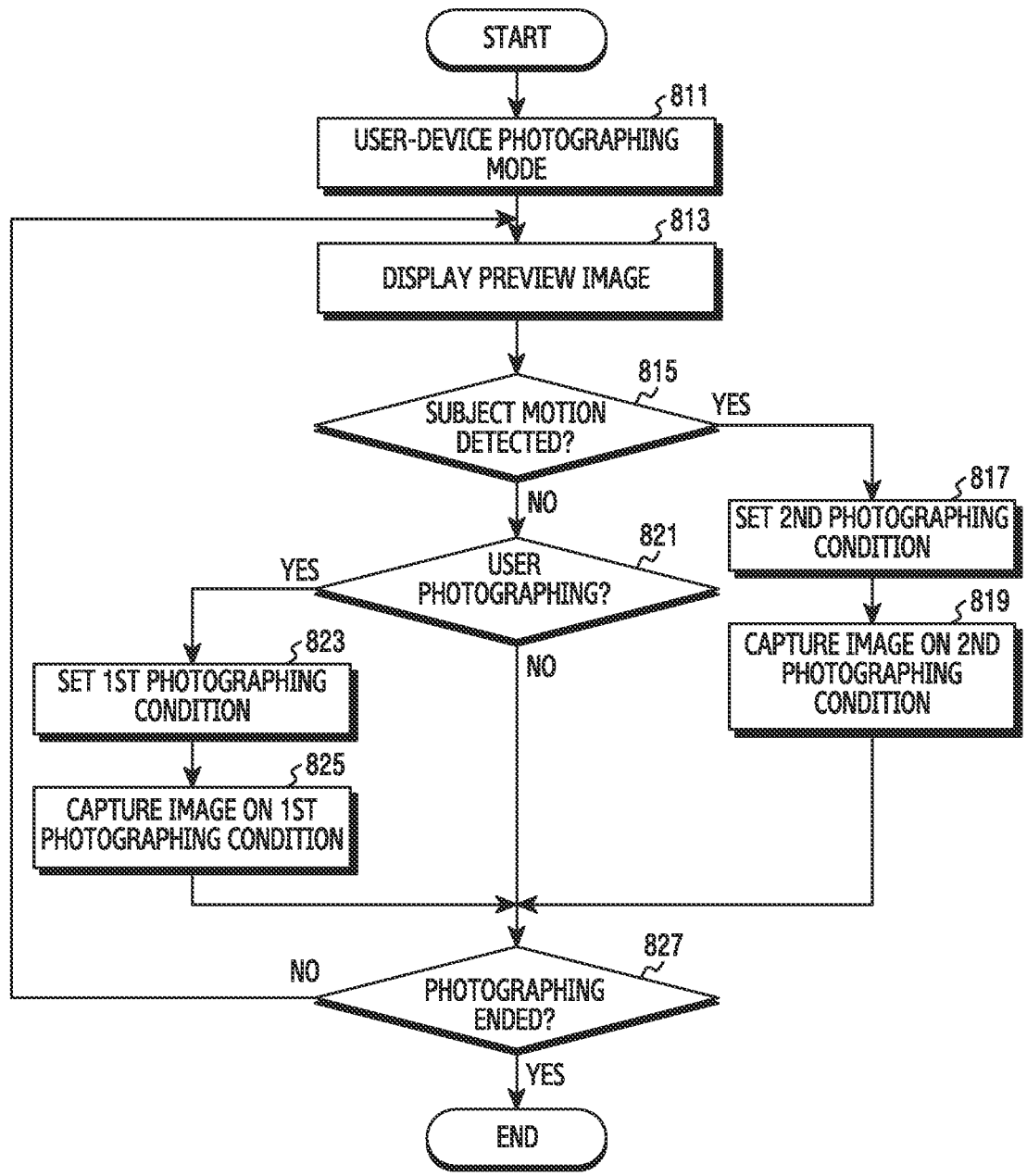
FIG. 8 is a flowchart illustrating an operation of photographing an image in an electronic device according to an embodiment of the present disclosure.

FIG. 8 is a flowchart illustrating an operation of photographing an image in an electronic device according to an embodiment of the present disclosure. FIG. 8 may be a flowchart illustrating an operation in which the electronic device automatically photographs when a motion of a subject is detected.

Referring to FIG. 8, a user may select a user-device photographing function from a photographing menu. If the user-device photographing function (mode) is selected, in operation 811, the electronic device (for example, the processor 100 of FIG. 1) may execute the user-device photographing function. For example, the electronic device may drive a camera module (for example, the camera module 120 of FIG. 1) and enable a module estimating a motion of a subject (for example, the motion estimating module 320 of FIG. 3 and/or the motion estimating module 720 of FIG. 7). In operation 813, the electronic device may process an image outputted from the camera module, to display a preview image on a display (for example, the display 150 of FIG. 1). The electronic device may display a photographing button on the display.

When an input of the photographing button or a motion of a subject is detected, the electronic device may capture an image outputted from the camera module. According to an embodiment, the electronic device may estimate the motion of the subject based on an optical flow method. If the motion of the subject is recognized, i.e., YES in operation 815, the electronic device may recognize this and, in operation 817, the electronic device may set a condition (i.e., a $2^{nd}$ photographing condition) for automatically photographing in the electronic device. In a case where the motion of the subject is generated, the electronic device may require a fast photographing operation. In operation 817, the electronic device may set a photographing interval time and/or an exposure time period short. If the photographing condition is set, in operation 819, the electronic device may capture an image at a fast interval time through the camera module. For example, if the motion of the subject is recognized, the electronic device may capture an image in a method such as a burst shot while the motion of the subject is detected.

If the motion of the subject is not recognized, i.e., NO in operation 815, and the user selects a photographing button, i.e., YES in operation 821, the electronic device may recognize this and, in operation 823, the electronic device may set a $1^{st}$ photographing condition according to the user's selection. When performing a photographing operation according to the user's selection, the electronic device may perform an automatic photographing mode, or a manual photographing mode in which a photographing condition is set by the user. In case where the mode is the automatic photographing mode, the electronic device may set the photographing condition in accordance with a photographing environment. In case where the mode is the manual photographing mode, the electronic device may manually capture an image on the $1^{st}$ photographing condition that is set by the user. After the electronic device sets the $1^{st}$ photographing condition, in operation 825, the electronic device may manually capture (acquire) an image in accordance with the set $1^{st}$ photographing condition.

If the photographing button is selected, the electronic device may acquire an image outputted from the camera module at a corresponding time point. If the motion of the subject is recognized, the electronic device may automatically acquire an image while the motion of the subject is detected. Accordingly, the electronic device may acquire an image if the user's selection or the motion of the subject is recognized in the user-device photographing mode.

If the user terminates the user-device photographing mode in process of performing the user-device photographing mode, in operation 827, the electronic device may recognize this, and stop the driving of the camera module and terminate the photographing operation. In contrast, if the user-device photographing mode is not terminated, the electronic device may return to operation 813 and repeat the aforementioned operations. If the motion of the subject is not recognized, i.e., NO at operation 815, and the user does not select the photographing button, i.e., NO in operation 821, the electronic device determines whether the user terminates the user-device photographing mode, in operation 827.

Figure 9:
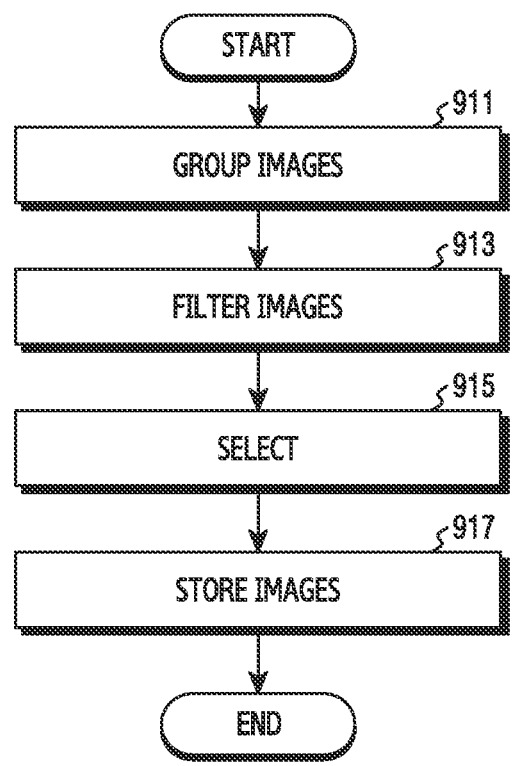
FIG. 9 is a flowchart illustrating an operation of processing a captured image in an electronic device according to an embodiment of the present disclosure.

FIG. 9 is a flowchart illustrating an operation of processing a captured image in an electronic device according to an embodiment of the present disclosure. FIG. 9 may be an operation of capturing an image that is acquired in accordance with a user's selection or a motion of a subject.

Referring to FIG. 9, the electronic device may capture many images if automatically performing a photographing operation while a motion of a subject is detected. When storing an image, the electronic device according to various embodiments of the present disclosure may analyze the captured images, to store the optimal number of images.

In operation 911, the electronic device may group images having similar subject motions, and display the grouped images on a display (for example, the display 150 of FIG. 1). After grouping the images, in operation 913, the electronic device may filter the grouped images. The image filtering may be an operation of selecting a photo that satisfies a proper condition or eliminating images not satisfying the proper condition. For example, the electronic device may eliminate at least one of blur images, images that are too dark, or images that are too bright.

After performing the image filtering operation, in operation 915, the electronic device may select images to be stored. The electronic device may suggest and display the set number of images (for example, one image) per image group. If the image is selected, in operation 917, the electronic device may store the selected image in a memory (for example, the memory 110 of FIG. 1). The electronic device may eliminate the remnant images excepting the image suggested or selected from the image group.

In an embodiment, the electronic device may analyze images automatically captured by the motion of the subject, to group similar images, and store a suggested or selected image among the grouped images and eliminate the remnant images.

Figure 10:
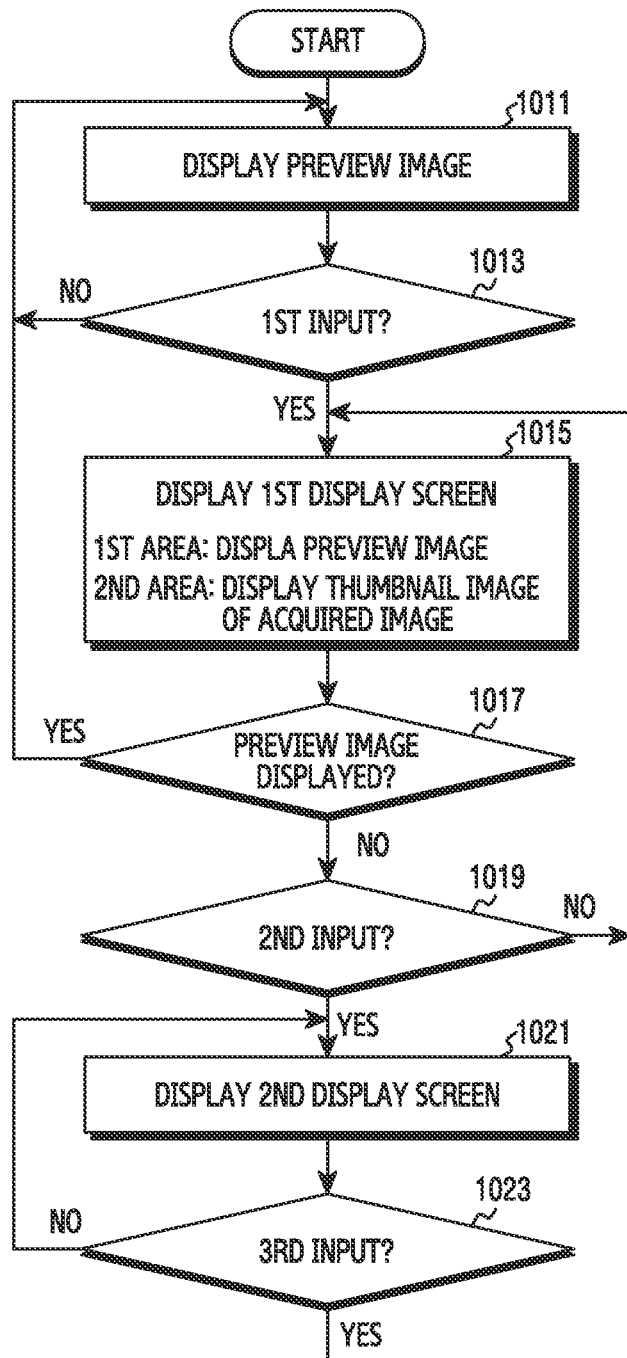
FIG. 10 is a flowchart illustrating an operation of displaying a photographed image in an electronic device according to an embodiment of the present disclosure.

FIG. 10 is a flowchart illustrating an operation of displaying a photographed image in an electronic device according to an embodiment of the present disclosure. FIG. 10 illustrates an example of a case in which a display of the electronic device is a single display.

Referring to FIG. 10, the electronic device may display images that are acquired in a user-device photographing mode, on the display. In operation 1011, the electronic device may display a preview image. The preview image displayed in operation 1011 may be a state in which the electronic device displays a screen as illustrated in FIG. 5A or FIG. 5F. In a state in which the preview image is displayed, a user may generate an input for displaying a thumbnail image and a preview image together. In a state of displaying a preview screen, if an input is not generated, i.e., NO in operation 1013, the process returns to operation 1011. Alternatively, in a state of displaying a preview screen, if an input (for example, the $1^{st}$ input 510 of FIG. 5B) by which the user selects 1st displaying is generated, i.e., YES in operation 1013, the electronic device may recognize this and, in operation 1015, the electronic device may display a 1st display screen on the display. As in FIG. 5B, the 1st display screen may display a preview image in the 1st area 520 and display thumbnail images of captured images in the 2nd area 530. The thumbnail images may be displayed in an edge area of the display.

In a state of displaying the 1st display screen of FIG. 5B, if an input (for example, the 4th input 575 of FIG. 5E) by which the user selects preview image displaying is generated, i.e., YES in operation 1017, the electronic device may recognize this, and return to operation 1011 and display the preview image on the display, as in FIG. 5F. In a state of displaying the preview image and the thumbnail images of the captured images, the electronic device may convert into a screen of displaying the preview image by a user's selection.

On the other hand, in a state of displaying the 1st display screen of FIG. 5B, if the user does not select preview image displaying, i.e., NO in operation 1017, and an input (for example, the 2nd input 515 of FIG. 5C) by which the user selects 2nd displaying is generated, i.e., YES in operation 1019, the electronic device may recognize this and, in operation 1021, the electronic device may display a 2nd display screen on the display. If the user does not select preview image displaying, i.e., NO in operation 1017, and the 2nd input is not generated, i.e., NO in operation 1019, the electronic device may recognize this and return to operation 1015. The 2nd display screen may display thumbnail images of captured images on the display, as in FIG. 5C. When the electronic device displays the thumbnail images, the electronic device may, as illustrated in FIG. 5C, display the latest thumbnail image manually captured by a user's selection in the 1st specific area 540 of the display, and display the latest thumbnail image automatically captured by a motion of a subject in the 2nd specific area 550 of the display, and may display the thumbnail images of the images captured by the user's selection and/or the electronic device in the 3rd specific area 560 of the display.

Also, when the electronic device displays the thumbnail images of the 2nd display screen on the display, the electronic device may distinguish and display an image manually captured by a user's selection or images automatically captured by the electronic device. FIG. 5C illustrates an example of adding and displaying an icon image on an image manually selected by a user, and not displaying an icon image on an image automatically captured by the electronic device. The electronic device may add and display a 1st icon image on the image manually selected by the user, and may display a 2nd icon image distinguished from the 1st icon image on the image automatically captured by the electronic device. Also, the electronic device may display an icon image on the image automatically captured by the electronic device, and may not display an icon image on the image manually selected by the user.

In a state of displaying the 2nd display screen, if the 3rd input 570 is sensed, as in FIG. 5D, i.e., YES in operation 1023, the electronic device may recognize this, and return to operation 1015 and display the 1st display screen on the display, as in FIG. 5E. In a state of displaying the 2nd display screen, if the 3rd input is not sensed, i.e., NO at operation 1023, the electronic device may recognize this, and return to operation 1021.

In accordance with a user's selection, the electronic device may display only a preview image, display the preview image and thumbnail images of captured images together, or display only the thumbnail images of the captured images. And, if the user ends the photographing, the electronic device may terminate the operation of displaying the image of FIG. 10.

The display of the electronic device may be a dual display. In case where the display is the dual display, the electronic device may display a preview image on a 1st display of the dual display, and display a thumbnail image of a captured image on a 2nd display.

Figure 11:
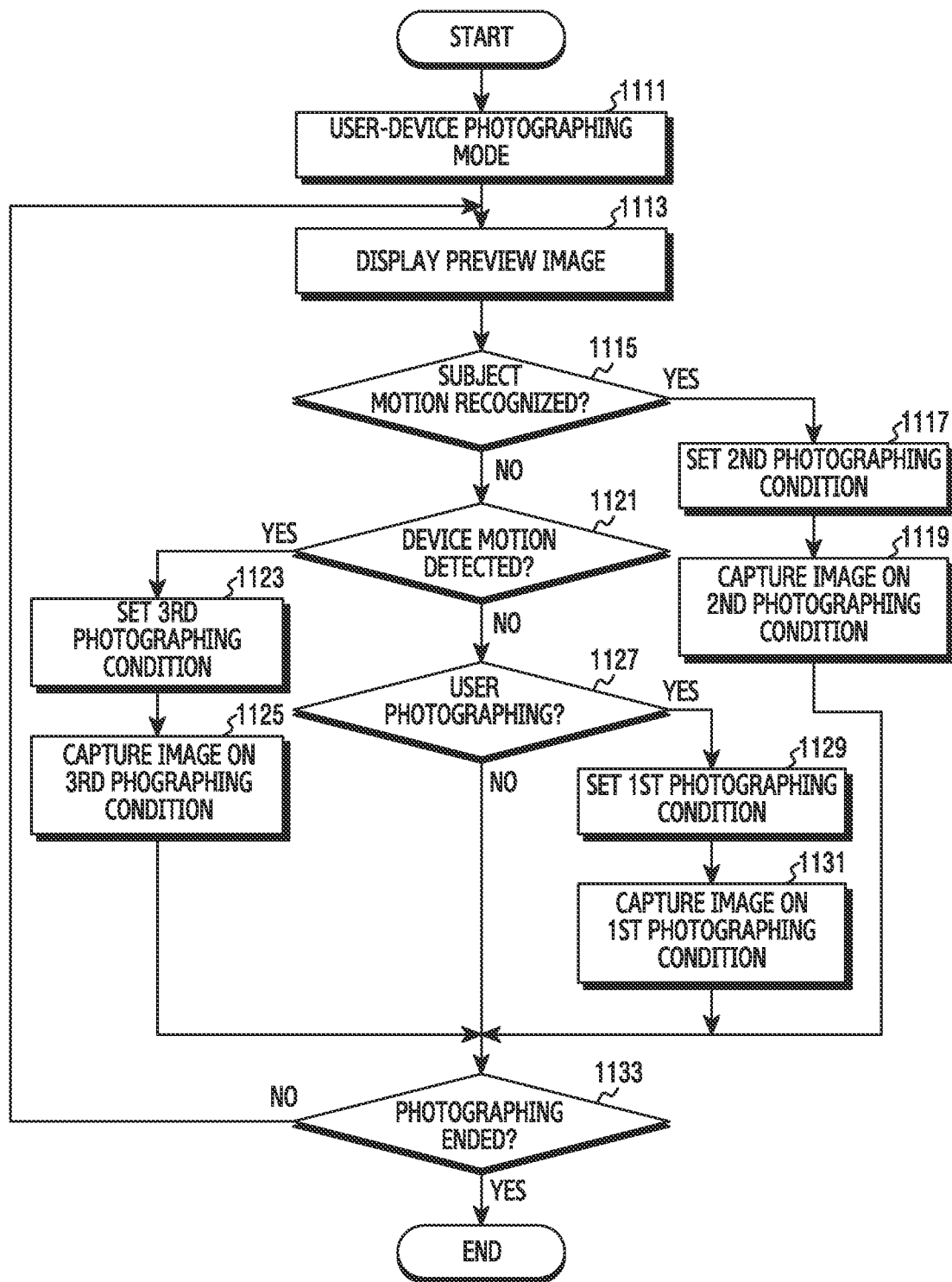
FIG. 11 is a flowchart illustrating an operation of photographing an image in an electronic device according to an embodiment of the present disclosure.

FIG. 11 is a flowchart illustrating an operation of photographing an image in an electronic device according to an embodiment of the present disclosure. FIG. 11 may be a flowchart illustrating an operation in which the electronic device automatically photographs if a motion of a subject or a motion of the device is detected.

Referring to FIG. 11, a user may select a user-device photographing function from a photographing menu. If the user-device photographing function (mode) is selected, in operation 1111, the electronic device (for example, the processor 100 of FIG. 1) may execute the user-device photographing function. For example, the electronic device may drive a camera module (for example, the camera module 120 of FIG. 1) and enable a module estimating a motion of a subject (for example, the motion estimating module 320 of FIG. 3 and/or the motion estimating module 720 of FIG. 7) and a module detecting a motion of the electronic device (for example, the device motion detecting module 760 of FIG. 7). In operation 1113, the electronic device may process an image outputted from the camera module, to display a preview image on a display (for example, the display 150 of FIG. 1). The electronic device may display a photographing button on the display. According to an embodiment, in operation 1113, the electronic device may display the preview image on the display in the method of FIG. 10 in accordance with a user's selection.

In operation 1115, the electronic device may estimate if there is a subject motion within an image. For example, the electronic device may compare a plurality of continuous frame images to estimate the subject motion within the image. If the motion of the subject is recognized, i.e., YES in operation 1115, the electronic device may recognize this and, in operation 1117, the electronic device may set a 2nd photographing condition for automatically capturing an image. If the motion of the subject is recognized, the electronic device may set the 2nd photographing condition having a shorter photographing interval time and/or exposure time than a 1st photographing condition. The photographing interval time and/or exposure time of the 2nd photographing condition may be variably set according to a velocity at which the subject moves, or may be set as a fixed value irrespective of the movement velocity of the subject. After setting the 2nd photographing condition, in operation 1119, the electronic device may control the camera module to automatically capture an image on the 2nd photographing condition.

If the motion of the subject is not recognized, i.e., NO in operation 1115, the electronic device may, in operation 1121 detect if there is a motion of the electronic device. The electronic device may have modes of moving the electronic device while photographing. For example, the user may move the electronic device in a horizontal or vertical direction while photographing. In this case, if a camera angle is changed, even a captured image may become different. If the motion of the electronic device is detected, i.e., YES in operation 1121, the electronic device may recognize this and, in operation 1123, the electronic device may set a 3rd photographing condition. The photographing interval time and/or exposure time of the $3^{rd}$ photographing condition may be variably set according to a movement velocity of the electronic device, or may be set as a fixed value irrespective of the movement velocity of the electronic device. After setting the $3^{rd}$ photographing condition, in operation 1125, the electronic device may control the camera module to automatically capture an image on the $3^{rd}$ photographing condition.

If the motion of the electronic device is not detected, i.e., NO in operation 1121, and if the user selects a photographing button, i.e., YES in operation 1127, the electronic device may recognize this and, in operation 1129, the electronic device may set a $1^{st}$ photographing condition according to the user's selection. When performing a photographing operation according to the user's selection, the electronic device may perform an automatic photographing mode, or a manual photographing mode in which a photographing condition is set by the user. In case where it is the automatic photographing mode, the electronic device may set the photographing condition in accordance with a photographing environment. In case where it is the manual photographing mode, the electronic device may manually capture an image on the $1^{st}$ photographing condition that is set by the user. After setting the $1^{st}$ photographing condition, in operation 1131, the electronic device may manually acquire an image on the set $1^{st}$ photographing condition.

If the photographing button is selected in operation 1127, the electronic device may acquire an image outputted from the camera module at a corresponding time point. Also, if a motion of a subject is recognized in operation 1115, the electronic device may set a $2^{nd}$ photographing condition, and if a motion of the electronic device is detected in operation 1121, the electronic device may set a $3^{rd}$ photographing condition, and capture an image based on the set $2^{nd}$ or $3^{rd}$ photographing condition. At this time, the $2^{nd}$ photographing condition and the $3^{rd}$ photographing condition may be set to have a mutually different photographing interval time and/or exposure time respectively, or may be set to have the same photographing interval time and/or exposure time.

If the user does not select a photographing button in operation 1127, i.e., NO in operation 1127, and if the user terminates the user-device photographing mode in process of performing the user-device photographing mode, i.e., YES in operation 1133, the electronic device may recognize this, and stop the driving of the camera module and end the photographing operation. In contrast, if the photographing mode is not terminated, i.e., NO in operation 1133, the electronic device may return to operation 1113 and repeat the aforementioned operations.

Figure 12:
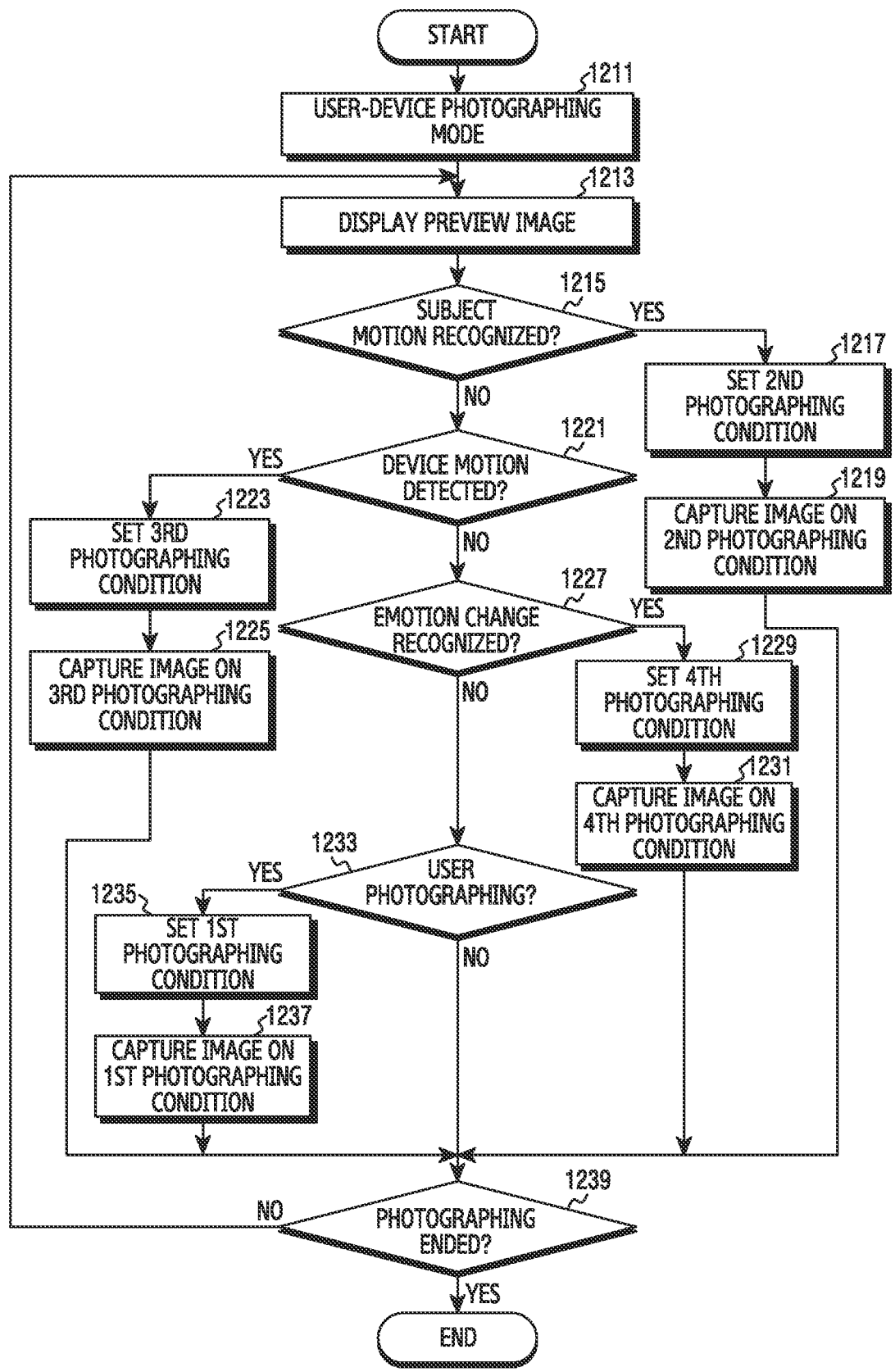
FIG. 12 is a flowchart illustrating an operation of photographing an image in an electronic device according to an embodiment of the present disclosure.

FIG. 12 is a flowchart illustrating an operation of photographing an image in an electronic device according to an embodiment of the present disclosure. FIG. 12 may be a flowchart illustrating an operation in which the electronic device automatically photographs if a motion of a subject, a motion of the device or the emotion of the subject is detected.

Referring to FIG. 12, a user may select a user-device photographing function from a photographing menu. If the user-device photographing function is selected, in operation 1211, the electronic device (for example, the processor 100 of FIG. 1) may execute the user-device photographing function. For example, the electronic device may drive a camera module (for example, the camera module 120 of FIG. 1) and enable a module estimating a motion of a subject (for example, the motion estimating module 320 of FIG. 3 and/or the motion estimating module 720 of FIG. 7), a module detecting a motion of the electronic device (for example, the device motion detecting module 760 of FIG. 7) and a module recognizing the emotion of the subject (for example, the emotion recognizing module 770 of FIG. 7). In operation 1213, the electronic device may process an image outputted from the camera module, to display a preview image on a display (for example, the display 150 of FIG. 1). The electronic device may display a photographing button on the display. According to an embodiment, in operation 1213, the electronic device may display the preview image on the display in the method of FIG. 10 in accordance with a user's selection.

In operation 1215, the electronic device may estimate if there is a motion of a subject within the image. For example, the electronic device may compare a plurality of continuous frame images, to estimate the subject motion within the image. If the motion of the subject is recognized, i.e., YES in operation 1215, the electronic device may recognize this and, in operation 1217, the electronic device may set a $2^{nd}$ photographing condition for automatically capturing an image. The photographing interval time and/or exposure time of the $2^{nd}$ photographing condition may be variably set according to a velocity at which the subject moves, or may be set as a fixed value irrespective of the movement velocity of the subject. After setting the $2^{nd}$ photographing condition, in operation 1219, the electronic device may control the camera module to automatically capture an image on the $2^{nd}$ photographing condition.

If the motion of the subject is not recognized, i.e., NO in operation 1215, in operation 1221, the electronic device may detect if there is a motion of the electronic device. For example, a user may move the electronic device in a horizontal or vertical direction while photographing. If the motion of the electronic device is detected, i.e., YES in operation 1221, the electronic device may recognize this and, in operation 1223, the electronic device may set a $3^{rd}$ photographing condition. The photographing interval time and/or exposure time of the $3^{rd}$ photographing condition may be variably set according to a movement velocity of the electronic device, or may be set as a fixed value irrespective of the movement velocity of the electronic device. After setting the $3^{rd}$ photographing condition, in operation 1225, the electronic device may control the camera module to automatically capture an image on the $3^{rd}$ photographing condition.

The subject may be a subject that is capable of expressing an emotion such as persons, pets, etc. If the subject motion is not recognized, i.e., NO in operation 1215 and the device motion is not detected, i.e., NO in operation 1221, in operation 1227, the electronic device may recognize the emotion of the subject. If a change of the emotion is recognized or a specific emotion (for example, happy, surprise, etc.) is recognized, i.e., YES in operation 1227, the electronic device may recognize this and, in operation 1229, the electronic device may set a $4^{th}$ photographing condition. The photographing interval time and/or exposure time of the $4^{th}$ photographing condition may be variably set according to a speed at which the emotion change of the subject is recognized, or may be set as a fixed value irrespective of the emotion change speed of the subject. After setting the $4^{th}$ photographing condition, in operation 1231, the electronic device may control the camera module to automatically capture an image on the $4^{th}$ photographing condition.

If the subject motion is not recognized, i.e., NO in operation 1215, device motion is not detected, i.e., NO in operation 1221, a change of the emotion or a specific motion is not recognized, i.e., NO in operation 1227, and the user selects a photographing button, i.e., YES in operation 1233, the electronic device may recognize this and, in operation 1235, the electronic device may set a $1^{st}$ photographing condition according to the user's selection. When performing a photographing operation according to the user's selection, the electronic device may perform an automatic photographing mode, or a manual photographing mode in which a photographing condition is set by the user. In case where it is the automatic photographing mode, the electronic device may set the photographing condition in accordance with a photographing environment. In case where it is the manual photographing mode, the electronic device may manually capture an image on the $1^{st}$ photographing condition that is set by the user. After setting the $1^{st}$ photographing condition, in operation 1237, the electronic device may manually acquire an image on the set $1^{st}$ photographing condition.

If the photographing button is selected, i.e., YES in operation 1233, the electronic device may acquire an image outputted from the camera module at a corresponding time point. Also, if a motion of a subject is recognized, the electronic device may set a $2^{nd}$ photographing condition and if a motion of the electronic device is detected, the electronic device may set a $3^{rd}$ photographing condition, and if the emotion change (or set emotion) of the subject is recognized, the electronic device may set a $4^{th}$ photographing condition, to capture an image based on the set photographing condition. At this time, the $2^{nd}$ photographing condition, the $3^{rd}$ photographing condition and the $4^{th}$ photographing condition may be set to have a mutually different photographing interval time and exposure time respectively, or may be set to have the same photographing interval time and/or exposure time.

If the photographing button is not selected, i.e., NO in operation 1233, and the user terminates the user-device photographing mode in process of performing the user-device photographing mode, i.e., YES in operation 1239, the electronic device may recognize this, and stop the driving of the camera module and end a photographing operation. In contrast, if the photographing mode is not terminated, i.e., NO in operation 1239, the electronic device may return to operation 1213 and repeat the aforementioned operations.

A method for operating in an electronic device according to various embodiments of the present disclosure may include the operations of, when a photographing request signal is received, estimating a motion of a subject within an image that is acquired in a camera, when the motion of the subject within the image acquired by the camera is not recognized, controlling the camera to capture a $1^{st}$ image by applying a $1^{st}$ photographing condition, and when the motion of the subject within the image acquired by the camera is recognized, controlling the camera to capture a $2^{nd}$ type image by applying a $2^{nd}$ photographing condition.

According to various embodiments, the $1^{st}$ and $2^{nd}$ photographing conditions may include at least one of a photographing interval time or an exposure time, and the $2^{nd}$ photographing condition may have at least one of a shorter interval time or exposure time than the $1^{st}$ photographing condition.

According to various embodiments, the operating method of the electronic device may further include the operations of: detecting a motion of the electronic device, and when the motion of the electronic device is detected, controlling the camera to capture a $3^{rd}$ type image by applying a $3^{rd}$ photographing condition.

According to various embodiments, the operating method of the electronic device may further include the operations of recognizing an emotion of the subject within the image that is photographed by the camera, and when an emotion change of the subject is recognized, controlling the camera to capture a $4^{th}$ type image by applying a $4^{th}$ photographing condition.

According to various embodiments, the controlling of the camera to capture the $2^{nd}$ type image may include the operations of grouping images that are similar among the captured images, filtering the grouped images, suggesting suggestion images comprising a set number of images of the filtered images, and storing the suggested images.

According to various embodiments, the filtering of the grouped images may include the operation of filtering blur images.

According to various embodiments, the operating method of the electronic device may further include the operations of displaying a preview image on a display, and based on a user's input, displaying the preview image in a $1^{st}$ area of the display and displaying thumbnail images of the captured images in a $2^{nd}$ area of the display.

According to various embodiments, the $2^{nd}$ area may be an edge area of the display.

According to various embodiments, the operating method of the electronic device may further include the operation of based on a user's input, displaying the thumbnail images of the captured images on the display in a photographing mode. The thumbnail images displayed on the display may be images that are captured by one of a user's selection or the electronic device and are distinguished and displayed.

According to various embodiments, an electronic device including an image sensor may perform a man-machine photographing or superimposed machine capture operation that is capable of photographing an image based on a user's selection and a photographing state recognition of the device. When the electronic device performs the photographing operation, the electronic device may detect (or recognize) a motion of a subject, a motion of the device, an emotion change of a subject (e.g., person), etc., and set, as a photographing condition, a state in which the motion of the subject, the motion of the device and/or the emotion change are detected. The electronic device may perform an automatic photographing operation based on the set photographing condition in a process of photographing, so the electronic device may automatically capture a subject image that a user may miss.

What is claimed is:

1. An electronic device comprising:
   a camera;
   a display;
   memory storing one or more computer programs; and
   one or more processors communicatively coupled to the camera, the display and the memory;
   wherein the one or more computer programs include computer-executable instructions that, when executed by the one or more processors individually or collectively, cause the electronic device to:
   execute a photographing function of the electronic device,
   in response to the photographing function being executed, display, on the display, a preview image that is currently being acquired by the camera of the electronic device,
   determine whether a motion of the electronic device and a motion of a subject in the preview image are detected,
   in response to the motion of the electronic device and the motion of the subject not being detected, execute an automatic photographing mode, and automatically photograph the subject in the automatic photographing mode.

2. The electronic device of claim 1, wherein the one or more computer programs further include computer-executable instructions that, when executed by the one or more processors individually or collectively, cause the electronic device to:
in response to the photographing function being executed, activate a function for detecting the motion of the electronic device.

3. The electronic device of claim 1, wherein the one or more computer programs further include computer-executable instructions that, when executed by the one or more processors individually or collectively, cause the electronic device to detect at least one of a horizontal movement, a vertical movement or a rotation movement of the electronic device, by using at least one of an acceleration sensor or a gyro sensor.

4. The electronic device of claim 1, wherein a photographing condition for the automatically photographing is set in accordance with a photographing environment of the electronic device, in the automatic photographing mode.

5. The electronic device of claim 1, wherein the one or more computer programs further include computer-executable instructions that, when executed by the one or more processors individually or collectively, cause the electronic device to:
determine whether the motion of the subject is detected, and
photograph the subject in the automatic photographing mode in response to the motion of the subject being not detected.

6. The electronic device of claim 5, wherein the one or more computer programs further include computer-executable instructions that, when executed by the one or more processors individually or collectively, cause the electronic device to:
photograph the subject according to a photographing condition related to the motion of the subject being not detected.

7. The electronic device of claim 6, wherein the photographing condition related to the motion of the subject being not detected is different from a photographing condition related to the motion of the subject being detected.

8. The electronic device of claim 7, wherein the photographing condition related to the motion of the subject being not detected comprises at least one of a photographing interval time or an exposure time.

9. The electronic device of claim 1, wherein the one or more computer programs further include computer-executable instructions that, when executed by the one or more processors individually or collectively, cause the electronic device to:
determine whether an emotion change of the subject is recognized, and
photograph the subject in the automatic photographing mode in response to the emotion change of the subject being detected.

10. The electronic device of claim 9, wherein the one or more computer programs further include computer-executable instructions that, when executed by the one or more processors individually or collectively, cause the electronic device to:
photograph the subject according to a photographing condition related to the emotion change of the subject.

11. A method performed by an electronic device for photographing a subject, the method comprising:
executing, by the electronic device, a photographing function of the electronic device;
in response to the photographing function being executed, displaying, by the electronic device, a preview image that is currently being acquired by a camera of the electronic device;
determining, by the electronic device, whether a motion of the subject is detected,
in response to the motion of the subject not being detected, determining, by the electronic device, whether a motion of the electronic device is detected;
in response to the motion of the electronic device not being detected, performing, by the electronic device, an automatic photographing mode; and
automatically photographing the subject in the automatic photographing mode.

12. The method of claim 11, the method further comprising:
in response to the photographing function being executed, activating a function for detecting the motion of the electronic device.

13. The method of claim 11, the determining whether the motion of the electronic device is detected comprising:
the detecting at least one of a horizontal movement, a vertical movement or a rotation movement of the electronic device, by using at least one of an acceleration sensor or a gyro sensor.

14. The method of claim 11, wherein a photographing condition for the automatically photographing is set in accordance with a photographing environment of the electronic device, in the automatic photographing mode.

15. The method of claim 11, the method further comprising:
determining whether the motion of the subject is detected, and
wherein the automatically photographing the subject comprises photographing the subject in the automatic photographing mode in response to the motion of the subject being not detected.

16. The method of claim 15, wherein the automatically photographing the subject comprises
photographing the subject according to a photographing condition related to the motion of the subject being not detected.

17. The method of claim 16, wherein the photographing condition related to the motion of the subject being not detected is different from a photographing condition related to the motion of the subject being detected.

18. The method of claim 17, wherein the photographing condition related to the motion of the subject being not detected comprises at least one of a photographing interval time or an exposure time.

19. The method of claim 11,
wherein the method further comprising:
determining whether an emotion change of the subject is recognized, and
wherein the automatically photographing the subject comprises photographing the subject in the automatic photographing mode in response to the emotion change of the subject being detected,.

20. The method of claim 19, wherein the automatically photographing the subject comprises photographing the subject according to a photographing condition related to the emotion change of the subject.

* * * * *